[12] United States Patent
Miyakawa et al.

(10) Patent No.: US 11,006,067 B2
(45) Date of Patent: May 11, 2021

(54) ELECTRONIC APPARATUS, REPRODUCTION DEVICE, REPRODUCTION METHOD, RECORDING MEDIUM, AND RECORDING METHOD

(71) Applicant: NIKON CORPORATION, Tokyo (JP)

(72) Inventors: Yoshiaki Miyakawa, Tokyo (JP); Naoki Yamagata, Shiki (JP)

(73) Assignee: NIKON CORPORATION, Tokyo (JP)

(*) Notice: Subject to any disclaimer, the term of this patent is extended or adjusted under 35 U.S.C. 154(b) by 0 days.

(21) Appl. No.: 15/509,572

(22) PCT Filed: Sep. 28, 2015

(86) PCT No.: PCT/JP2015/077380
§ 371 (c)(1),
(2) Date: Jul. 18, 2017

(87) PCT Pub. No.: WO2016/052433
PCT Pub. Date: Apr. 7, 2016

(65) Prior Publication Data
US 2018/0091762 A1   Mar. 29, 2018

(30) Foreign Application Priority Data

Sep. 30, 2014 (JP) .............................. JP2014-201951

(51) Int. Cl.
*H04N 5/77* (2006.01)
*H04N 5/232* (2006.01)
(Continued)

(52) U.S. Cl.
CPC ............ *H04N 5/77* (2013.01); *H04N 5/2351* (2013.01); *H04N 5/2353* (2013.01);
(Continued)

(58) Field of Classification Search
CPC .. H04N 5/23216; H04N 5/353; H04N 5/2355; H04N 5/77; H04N 5/341; H04N 5/91
See application file for complete search history.

(56) References Cited

U.S. PATENT DOCUMENTS

2007/0195182 A1* 8/2007 Ito .................. H04N 5/23245
                                                      348/308
2008/0018760 A1* 1/2008 Nakajima ............ H04N 5/365
                                                      348/296
(Continued)

FOREIGN PATENT DOCUMENTS

JP    2006-049361 A    2/2006
JP    2006-319529 A   11/2006
(Continued)

OTHER PUBLICATIONS

Dec. 8, 2015 Search Report issued in International Patent Application No. PCT/JP2015/077380.
(Continued)

*Primary Examiner* — Ahmed A Berhan
(74) *Attorney, Agent, or Firm* — Oliff PLC

(57) ABSTRACT

An electronic apparatus includes: an input unit that inputs data for imaging conditions for each of a plurality of imaging regions included in an image capturing unit, different imaging conditions being set for each of the imaging regions; and a recording control unit that correlates the data for imaging conditions inputted from the input unit with the imaging regions and records correlated data in a recording unit.

8 Claims, 26 Drawing Sheets

(51) Int. Cl.
*H04N 5/92* (2006.01)
*H04N 5/91* (2006.01)
*H04N 5/341* (2011.01)
*H04N 5/235* (2006.01)
*H04N 5/243* (2006.01)

(52) U.S. Cl.
CPC ......... *H04N 5/23216* (2013.01); *H04N 5/243* (2013.01); *H04N 5/341* (2013.01); *H04N 5/91* (2013.01); *H04N 5/9201* (2013.01)

(56) References Cited

U.S. PATENT DOCUMENTS

| | | | |
|---|---|---|---|
| 2010/0231738 A1* | 9/2010 | Border | H04N 5/232 348/222.1 |
| 2012/0081573 A1 | 4/2012 | Park | |
| 2013/0051700 A1* | 2/2013 | Jo | H04N 5/23254 382/284 |
| 2013/0140467 A1 | 6/2013 | Kitano et al. | |
| 2016/0014359 A1 | 1/2016 | Ota | |

FOREIGN PATENT DOCUMENTS

| | | |
|---|---|---|
| JP | 2008-139487 A | 6/2008 |
| JP | 2009-164951 A | 7/2009 |
| JP | 2012-139026 A | 7/2012 |
| JP | 2014-179892 A | 9/2014 |
| WO | 2013/164915 A1 | 11/2013 |
| WO | 2014/133076 A1 | 9/2014 |

OTHER PUBLICATIONS

Feb. 15, 2018 Extended Search Report issued in European Patent Application No. 15846424.8.
Jun. 12, 2018 Office Action issued in Japanese Patent Application No. 2014-201951.
Apr. 2, 2019 Office Action issued in Japanese Patent Application No. 2014-201951.
Nov. 13, 2018 Notification of Resasons for Refusal issued in Japanese Patent Application No. 2014-201951.
Jul. 24, 2019 Reconsideration Report by Examiner Before Appeal issued in Japanese Patent Application No. 2014-201951.
Jun. 26, 2019 Office Action issued in European Patent Application No. 15846424.8.
Jun. 4, 2019 Office Action issued in Chinese Patent Application No. 201580064740.4.
Mar. 17, 2020 Office Action issued in Japanese Patent Application No. 2014-201951.

* cited by examiner

FIG.6
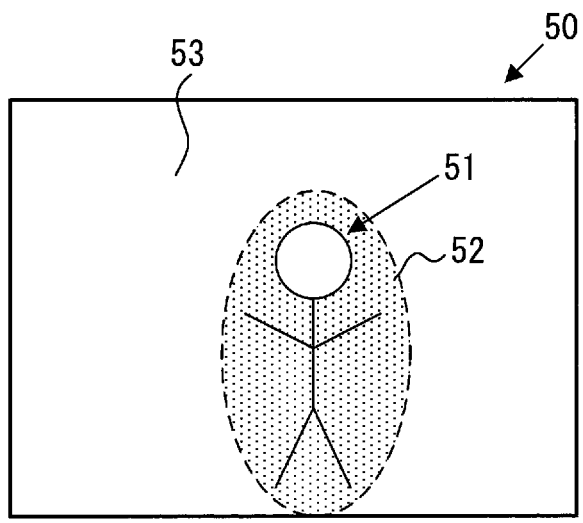
(a)    (b)
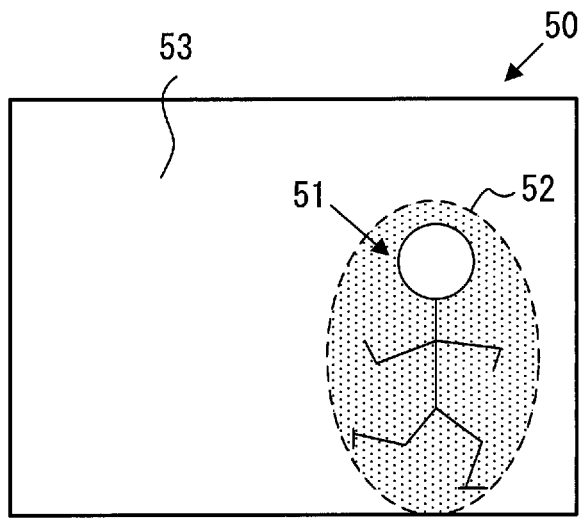
(c)    (d)

FIG.9
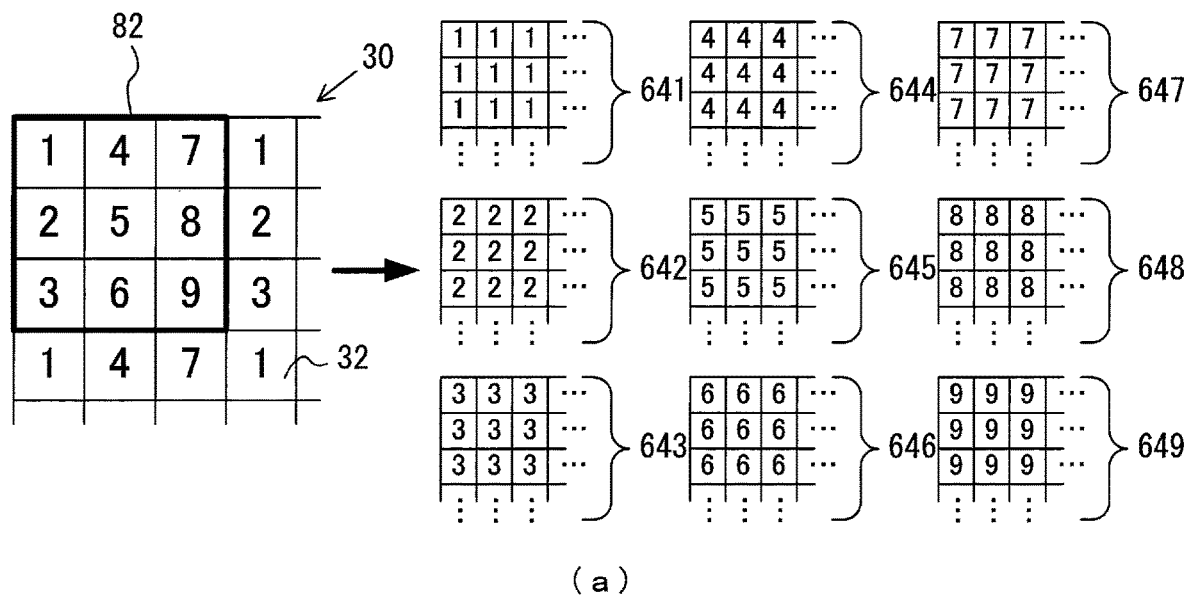
(a)
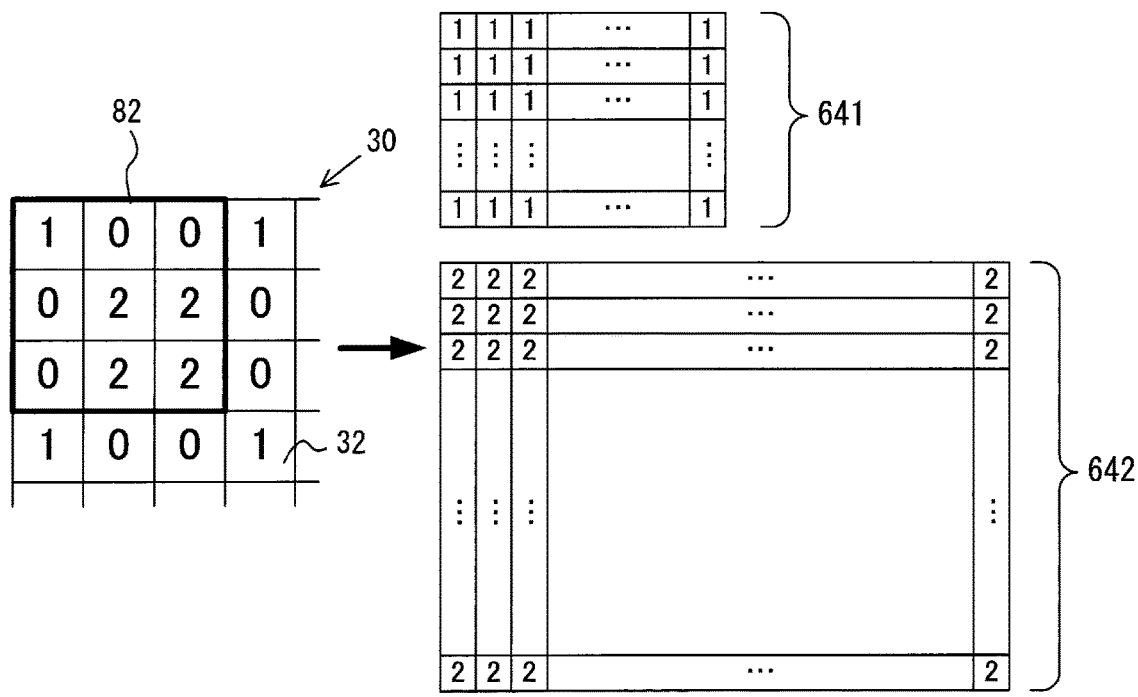
(b)

FIG.17
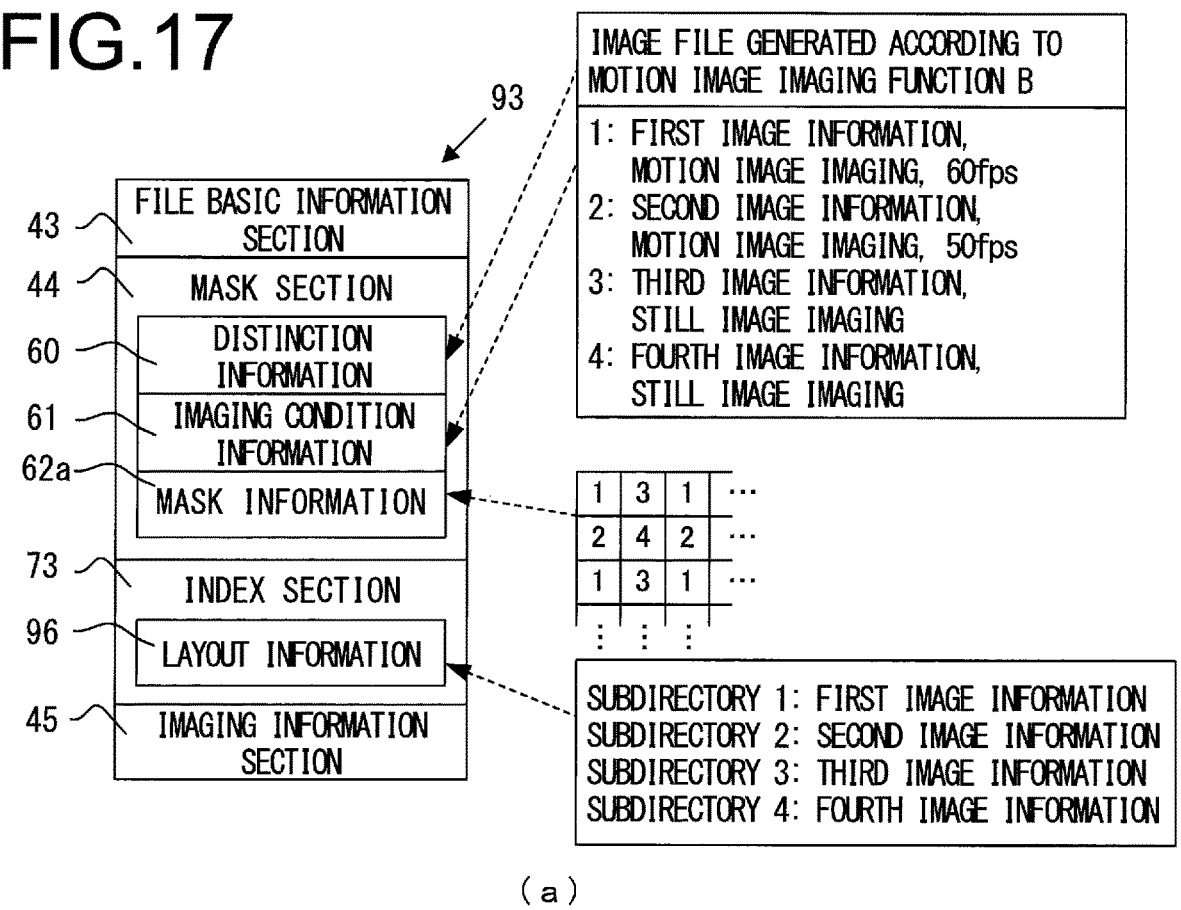
(a)
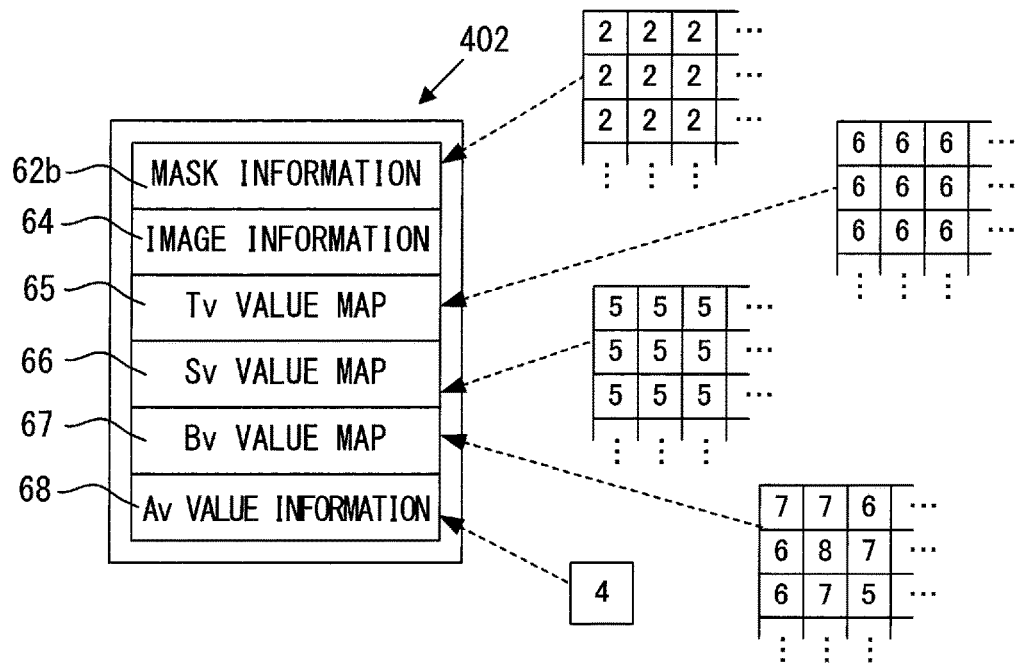
(b)

ELECTRONIC APPARATUS, REPRODUCTION DEVICE, REPRODUCTION METHOD, RECORDING MEDIUM, AND RECORDING METHOD

TECHNICAL FIELD

The present invention relates to an electronic apparatus, a reproduction device, a reproduction method, a recording medium, and a recording method.

BACKGROUND ART

An electronic apparatus that is provided with an image sensor in which an image capturing chip of the backside illumination type and a signal processing chip are laminated (hereafter, referred to as a laminated type image sensor) has been proposed (refer to Patent Document #1). In such a laminated type image sensor, the image capturing chip of the backside illumination type and the signal processing chip are laminated together so as to be connected together at each of predetermined regions via micro bumps.

CITATION LIST

Patent Literature

Patent Document #1: Japanese Laid-Open Patent Publication 2006-49361.

SUMMARY OF INVENTION

Technical Problem

With regard to an electronic apparatus incorporating such a conventional laminated type image sensor, there have been not so many proposals for dividing an image into one or more imaging regions each having such a predetermined region and acquiring a captured image for each imaging region. Thus, it can be said that electronic apparatuses provided with image sensors of the laminated type have insufficient usability.

Solution to Problem

An electronic apparatus according to a 1st aspect of the present invention comprises: an input unit that inputs data for imaging conditions for each of a plurality of imaging regions included in an image capturing unit, different imaging conditions being set for each of the imaging regions; and a recording control unit that correlates the data for imaging conditions inputted from the input unit with the imaging regions and records correlated data in a recording unit.

According to a 2nd aspect of the present invention in the electronic apparatus according to the 1st aspect, it is preferable that the input unit inputs image data generated by the image capturing unit; and the recording control unit correlates the image data inputted from the input unit with the imaging regions and records correlated data in the recording unit.

According to a 3rd aspect of the present invention, in the electronic apparatus according to the 1st aspect, it is preferable that the input unit inputs image data generated by the image capturing unit; and the recording control unit correlates the image data inputted from the input unit with the data for the imaging conditions and records correlated data in the recording unit.

According to a 4th aspect of the present invention, in the electronic apparatus according to any one of the 1st to 3rd aspects, it is preferable that the input unit inputs data for information relating to positions of the imaging regions; and the recording control unit correlates the data for the imaging conditions inputted from the input unit with the information relating to the positions of the imaging regions and records correlated data in the recording unit.

An electronic apparatus according to a 5th aspect of the present invention comprises: an input unit that inputs data for imaging conditions for each of a plurality of pixel groups included in an image capturing unit, each of the pixel groups including at least one pixel, and different imaging conditions being set for each of the pixel groups; and a recording control unit that correlates the imaging condition data inputted from the input unit with the pixel groups and records correlated data in the recording unit.

According to a 6th aspect of the present invention, in the electronic apparatus according to the 5th aspect, it is preferable that the input unit inputs image data generated by the image capturing unit; and the recording control unit correlates the image data inputted from the input unit with the pixel groups and records correlated data in the recording unit.

According to a 7th aspect of the present invention, in the electronic apparatus according to the 6th aspect, it is preferable that the imaging conditions include a first imaging condition and a second imaging condition; the input unit inputs data for the first imaging condition and data for the second imaging condition of the pixel groups; and the recording control unit records the data for the first imaging condition of the pixel groups inputted from the input unit in the recording unit corresponding to a position of the image data for each of the pixel groups, and records the data for the second imaging condition of the pixel groups inputted from the input unit in the recording unit corresponding to a position of the image data for each of the pixel groups.

According to a 8th aspect of the present invention, in the electronic apparatus according to any one of the 5th to 7th aspects, it is preferable that imaging conditions for first pixel group and second pixel group among the plurality of pixel groups are imaging conditions for capturing still-images.

According to a 9th aspect of the present invention, in the electronic apparatus according to any one of the 5th to 7th aspects, it is preferable that imaging conditions for first pixel group and second pixel group among the plurality of pixel groups are imaging conditions for capturing motion-images.

According to a 10th aspect of the present invention, in the electronic apparatus according to any one of the 5th to 7th aspects, it is preferable that an imaging condition for a first pixel group among the plurality of pixel groups is an imaging condition for motion-images and an imaging condition for a second pixel group among the plurality of pixel groups is an imaging condition for still-images.

According to a 11th aspect of the present invention, in the electronic apparatus according to any one of the 1st to 10th aspects, it is preferable that the data for imaging conditions contains information relating to exposure for capturing an image of a subject by the image capturing unit.

According to a 12th aspect of the present invention, in the electronic apparatus according to any one of the 1st to 11th aspects, it is preferable that the data for imaging conditions contains information relating to brightness of a subject whose image is captured by the image capturing unit.

According to a 13th aspect of the present invention, in the electronic apparatus according to any one of the 1st to 12th aspects, it is preferable that the data for imaging conditions contains information relating to an imaging operation of the image capturing unit.

According to a 14th aspect of the present invention, in the electronic apparatus according to any one of the 1st to 13th aspects, it is preferable that the data for imaging conditions contains information relating to luminance of a subject whose image is captured by the image capturing unit.

According to a 15th aspect of the present invention, in the electronic apparatus according to any one of the 1 st to 4th aspects, it is preferable that the imaging regions each have a photoelectric conversion unit that accumulates a photoelectrically converted charge, and the data for imaging conditions contains a time period of accumulation of charge by the photoelectric conversion unit.

According to a 16th aspect of the present invention, in the electronic apparatus according to any one of the 1st to 15th aspects, it is preferable that the image capturing unit has an amplification unit that amplifies a signal generated from a photoelectrically converted charge for each of the imaging regions; and the data for imaging conditions contains an amplification factor of the amplification unit.

According to a 17th aspect of the present invention, in the electronic apparatus according to any one of the 2nd, 3rd, 6th, and 7th aspects, it is preferable that the recording control unit correlates mask information relating to use of each of the plurality of imaging regions or of each of the plurality of pixel groups with the image data and records correlated data in the recording unit.

According to a 18th aspect of the present invention, in the electronic apparatus according to the 17th aspect, it is preferable that the mask information contains dynamic information that changes with lapse of time.

According to a 19th aspect of the present invention, in the electronic apparatus according to the 18th aspect, it is preferable that the dynamic information is information that indicates whether the image data contains a pixel value corresponding to a pixel signal read out from a pixel belonging to the imaging regions or the pixel groups.

A reproduction device according to a 20th aspect of the present invention comprises: an input unit that inputs image data generated by an image capturing unit that has a plurality of imaging regions and performs image-capturing under different imaging conditions for each of the imaging regions and data for the imaging conditions for each of the imaging regions; and a reproduction unit that reproduces the image data based on the data for the imaging condition corresponding to a position of the image data inputted from the input unit.

A reproduction device according to a 21st aspect of the present invention comprises: an input unit that inputs image data generated by an image capturing unit that has a plurality of pixel groups each including at least one pixel and performs image-capturing under different imaging conditions for each of the pixel groups, and data for the imaging conditions for each of the pixel groups; and a reproduction unit that reproduces the image data based on the data for the imaging conditions corresponding to a position of the image data inputted from the input unit.

A reproduction method according to a 22nd aspect of the present invention comprises: inputting image data generated by an image capturing unit that has a plurality of imaging regions and performs image-capturing under different imaging conditions for each of the imaging regions, and data for the imaging conditions for each of the imaging regions; and reproducing the image data based on the data for the imaging conditions corresponding to a position of the inputted image data.

A reproduction method according to a 23rd aspect of the present invention comprises: inputting image data generated by an image capturing unit that has a plurality of pixel groups each containing at least one pixel and that performs image-capturing under different imaging conditions for each of the pixel groups, and data for the imaging conditions for each of the pixel groups; and reproducing the image data based on the data for the imaging conditions corresponding to a position of the inputted image data.

A recording medium according to a 24th aspect of the present invention has recorded therein image data generated by an image capturing unit that has a plurality of imaging regions and performs image-capturing under different imaging conditions for each of the imaging regions, and data for the imaging conditions for each of the imaging regions corresponding to a position of the image data.

A recording medium according to a 25th aspect of the present invention has recorded therein image data generated by an image capturing unit that has a plurality of pixel groups each containing at least one pixel and performs image-capturing under different imaging conditions for each of the pixel groups, and data for the imaging conditions for each of the pixel groups corresponding to a position of the image data.

A recording method according to a 26th aspect of the present invention comprises: recording image data generated by an image capturing unit that has a plurality of imaging regions and performs image-capturing under different imaging conditions for each of the imaging regions, and data for the imaging conditions for each of the imaging regions corresponding to a position of the image data.

A recording method according to a 27th aspect of the present invention comprises: recording image data generated by an image capturing unit that has a plurality of pixel groups each containing at least one pixel and performs image-capturing under different imaging conditions for each of the pixel groups, and data for the imaging conditions for each of the pixel groups corresponding to a position of the image data.

BRIEF DESCRIPTION OF DRAWINGS

FIG. 6 shows illustrative diagrams for explaining a motion-image image capturing function A.

FIG. 9 shows diagrams showing an example of the layout of a large group.

FIG. 17 shows diagrams schematically showing the structure of each file according to the second embodiment.

DESCRIPTION OF EMBODIMENTS

First Embodiment

Figure 23:
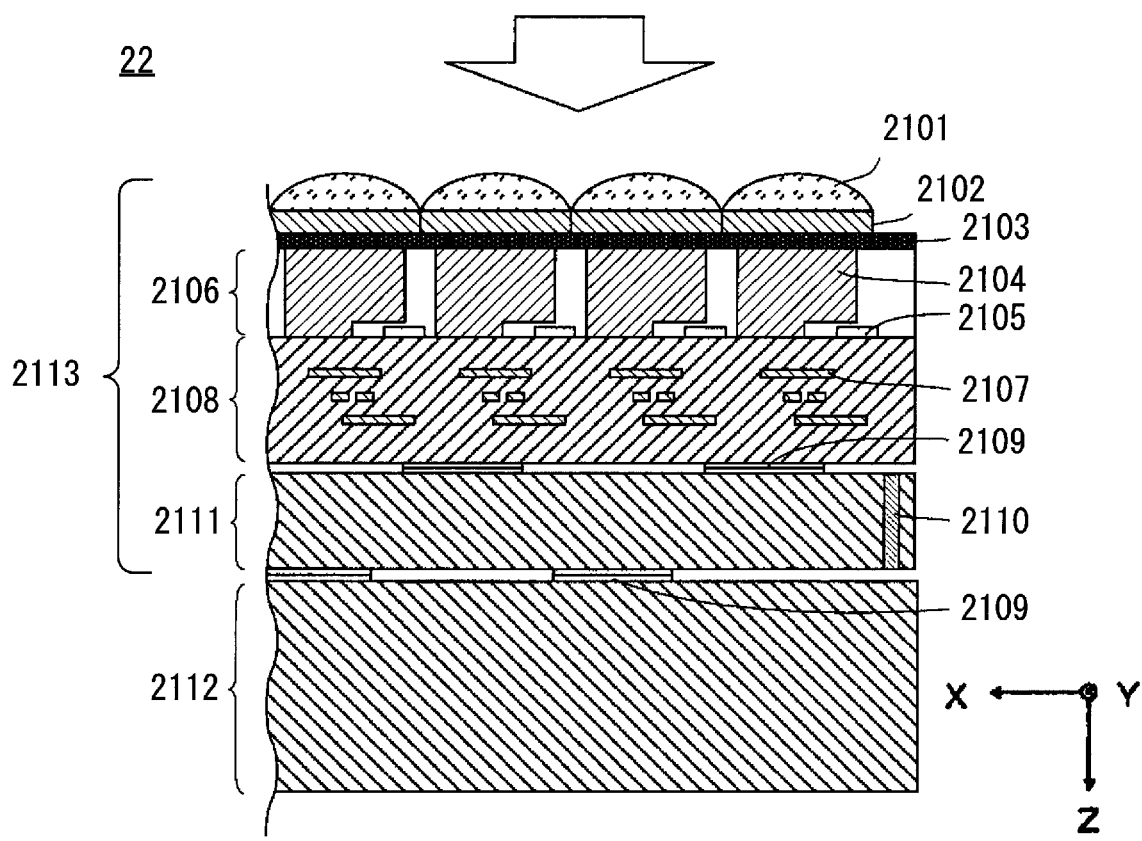
FIG. 23 is a cross-sectional view of a laminated type image sensor.

At first, explanation will be made on a laminated type image sensor 22 to be mounted on an electronic apparatus (for instance, image capturing device 10) according to the present invention. This laminated type image sensor 22 is described in Japanese Patent Application No. 2012-139026 which was filed earlier by the applicant of this application. FIG. 23 is a sectional view of the laminated type image sensor 22. The image sensor 22 includes a backside illumination type image capturing chip 2113 that outputs a pixel signal corresponding to incident light, a signal processing chip 2111 that processes the pixel signal, and a memory chip 2112 that stores the pixel signal. These image capturing chip 2113, signal processing chip 2111, and memory chip 2112 are laminated, and are electrically connected with each other via conductive bumps 2109 made of Cu and the like.

Note that, as illustrated, incident light is incident mainly in the Z axis positive direction that is indicated with an outlined white arrow. In this embodiment, the surface of the image capturing chip 2113 on a side on which the incident light is incident is called a backside. Also, as indicated with coordinate axes, the leftward direction on the figure that is orthogonal to the Z axis is referred to as the X axis positive direction and the front side direction in the figure that is orthogonal to the Z and X axes is referred to as the Y axis positive direction. In several figures mentioned below, the coordinate axes are displayed such that the orientation of each figure can be known on the basis of the coordinate axes in FIG. 23.

One example of the image capturing chip 2113 is a backside illumination type MOS image sensor. A PD layer 2106 is arranged on the backside of an interconnection layer 2108. The PD layer 2106 has a plurality of PDs (photo diodes) 2104 that are two-dimensionally arranged and accumulate electrical charges according to incident light, and transistors 2105 provided corresponding to the PDs 2104.

On the incident light incidence side of the PD layer 2106 are provided color filters 2102 via a passivation film 2103. There is a plurality of types of the color filters 2102 that allow passage of light beams of mutually different wavelength ranges, and the color filters 2102 are each arranged in a specific array corresponding to the respective PDs 2104. The arrays of the color filters 2102 are described below. A set of a color filter 2102, a PD 2104, and a transistor 2105 forms one pixel.

On the incident light incidence side of the color filter 2102 is provided a micro lens 2101 that corresponds to each pixel. The micro lens 2101 condenses incident light toward the corresponding PD 2104.

The interconnection layer 2108 has interconnections 2107 that each transmit a pixel signal from the PD layer 2106 to the signal processing chip 2111. The interconnection 2107 may be a multilayer, and may be provided with a passive element and an active element.

On a front surface of the interconnection layer 2108 is arranged a plurality of the bumps 2109. These bumps 2109 are aligned with a plurality of bumps 2109 that are provided on the opposing surface of the signal processing chip 2111, and the image capturing chip 2113 and the signal processing chip 2111 are pressed against each other, thereby, the aligned bumps 2109 are bonded and electrically connected with each other.

Similarly, a plurality of bumps 2109 are arranged on the mutually opposing surfaces of the signal processing chip 2111 and the memory chip 2112. These bumps 2109 are aligned with each other, and, for example, the signal processing chip 2111 and the memory chip 2112 are pressed against each other; thereby, the aligned bumps 2109 are bonded and electrically connected with each other.

Note that the bonding between the bumps 2109 is not limited to Cu bump bonding by solid phase diffusion, but micro bump joining by solder melting may be adopted. Also, approximately one bump 2109 may be provided, for example, for each block described below. Accordingly, the size of the bump 2109 may be larger than the pitch of the PDs 2104. Also, in a peripheral region other than a pixel region where pixels are arrayed, a bump that is larger than the bumps 2109 that correspond to the pixel region may also be provided.

The signal processing chip 2111 has a TSV (through-silicon via) 2110 through which circuits provided on the front side and backside, respectively, of the chip are connected. The TSV 2110 is preferably provided in the peripheral region. Also, the TSV 2110 may be provided also in the peripheral region of the image capturing chip 2113 and of the memory chip 2112.

Figure 24:
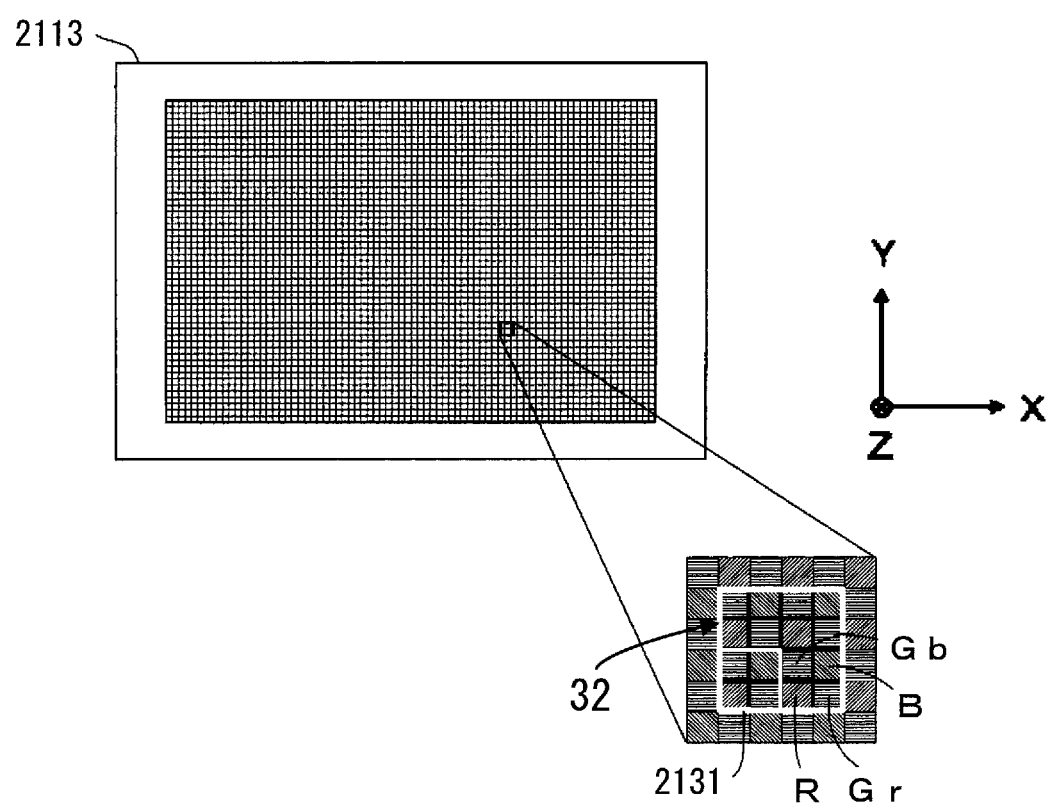
FIG. 24 is a diagram for explaining a pixel array and a block of an image capturing chip.

FIG. 24 is a figure for explaining the arrangement of pixels of the image capturing chip 113. In particular, the figure shows a situation in which the image capturing chip 2113 is observed from its backside surface. For example, eight million pixels or more pixels are arranged in the form of a matrix in the pixel region. In this embodiment, for instance, four adjacent pixels in a 2×2 configuration constitute a single block 2131. Four adjacent blocks in a 2×2 configuration constitute a single unit group 32. Grid lines in the figure conceptually show the way in which adjacent pixels are grouped to form the block 2131 and the unit group 32. The number of pixels that constitute each block 2131 and the number of blocks that constitute each unit group 32 are not limited to the example described above; each of them may be greater or smaller than it.

As illustrated in the enlarged view of a part of the pixel region, a block 2131 includes, within its upper left, upper right, lower left, and lower right portions, four so-called Bayer arrays each consisting of green pixels Gb, Gr, a blue pixel B, and a red pixel R. The green pixels are pixels that have green filters as their color filters 2102, and receive light of the green wavelength range in the incident light. Similarly, the blue pixels are pixels that have blue filters as their color filters 2102, and receive light of the blue wavelength range in the incident light, and the red pixels are pixels that have red filters as their color filters 2102, and receive light of the red wavelength range in the incident light.

In this embodiment, a plurality of blocks 2131 is defined so that at least one group of four pixels Gb, Gr, B, and R is included in one block 2131. Each of the blocks 2131 can be individually controlled with control parameters that are determined separately for the four pixels in that block 2131. In other words, image signals whose imaging conditions (or image capturing conditions) are different from each other can be respectively acquired. Examples of the control parameters include frame rate, gain, sub-sampling ratio, number of rows or number of columns to be added together, charge accumulation time, number of bits for digitization, and so on. Furthermore, a control parameter may be a parameter for image processing after acquiring image signals from the pixels.

Figure 25:
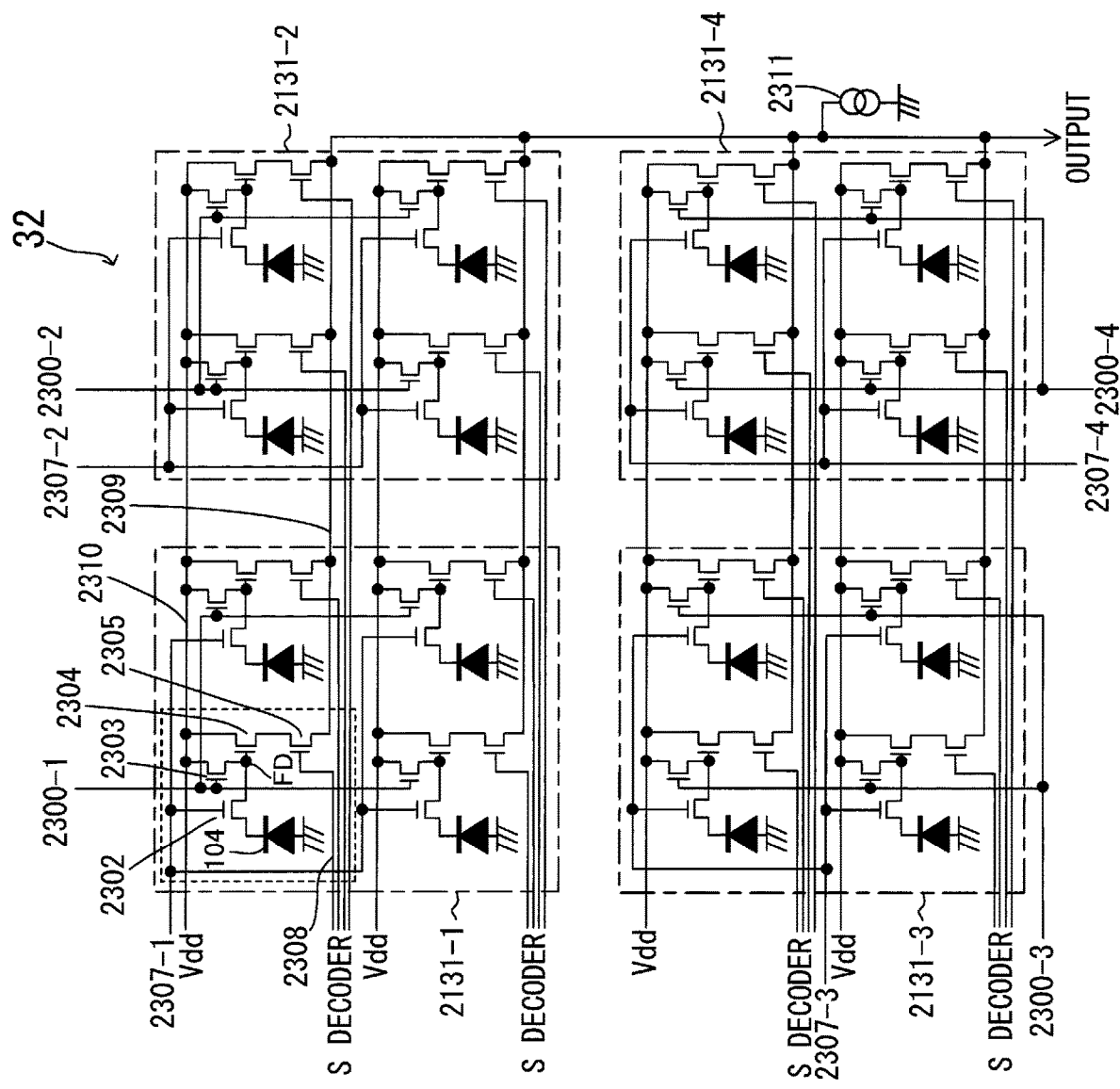
FIG. 25 is a circuit diagram that corresponds to a unit of an image capturing chip.

FIG. 25 is a circuit diagram corresponding to a single unit group 32 upon the image capturing chip 2113. In FIG. 25, the representative rectangle surrounded by the dotted line shows the circuit that corresponds to a single pixel. Moreover, each of the rectangles surrounded by a single dotted broken line corresponds to a single block 2131. It should be understood that at least some of the transistors explained in the following description correspond to the transistors 2105 of FIG. 23.

As described above, each of the unit groups 32 is formed from four of the blocks 2131. Reset transistors 2303 of the pixels included in the unit group 32 are turned ON and OFF by units of the blocks 2131. Moreover, transfer transistors 2302 of the pixels included in the unit group 32 are also turned ON and OFF by units of the blocks 2131. In the example shown in FIG. 25, reset wiring 2300-1 is provided for turning the four reset transistors 2303 corresponding to the upper left block 2131-1 ON and OFF, and also TX wiring 2307-1 is provided for supplying transfer pulses to the four transfer transistors 2302 corresponding to that same block 2131-1.

In a similar manner, reset wiring 2300-3, which is provided separately from the reset wiring 2300-1 described above, is provided for turning the four reset transistors 2303 corresponding to the lower left block 2131-3 ON and OFF. Moreover, TX wiring 2307-3, which is provided separately from the TX wiring 2307-1 described above, is provided for supplying transfer pulses to turn the four transfer transistors 2302 corresponding to that same block 2131-3 ON and OFF.

In a similar manner for the upper right block 2131-2 and for the lower right block 2131-4 as well, respective reset wiring 2300-2 and TX wiring 2307-2, and reset wiring 2300-4 and TX wiring 2307-4, are provided respectively for those blocks 2131.

The sixteen PDs 2104 corresponding to each pixel are connected to the respectively corresponding transfer transistors 2302. And transfer pulses are supplied via the TX wiring for each of the blocks 2131 described above to the gates of the transfer transistors 2302. The drain of each transfer transistor 2302 is connected with the source of each corresponding reset transistor 2303, and also a so-called floating diffusion FD between the drain of the transfer transistor 2302 and the source of the reset transistor 2303 is connected with the gate of an amplifying transistor 2304.

The drains of the reset transistors 2303 are connected in common to Vdd wiring 2310 to which power supply voltage is supplied. And reset pulses are supplied via reset wiring to the gates of the reset transistors 2303 of each of the blocks 2131 described above.

The drains of the amplification transistors 2304 are connected in common to the Vdd wiring 2310, to which power supply voltage is supplied. Furthermore, the source of each of the amplification transistors 2304 is connected to the drain of the corresponding selection transistor 2305. And decoder wiring 2308, to which selection pulses are supplied, is connected to the gate of each of the selection transistors 2305. In this embodiment, such decoder wiring 2308 is provided independently for each of the sixteen selection transistors 2305. And the source of each of the selection transistors 2305 is connected to common output wiring 2309. A load current source 2311 supplies current to the output wiring 2309. In other words, the output wiring 2309 for the selection transistors 2305 is configured according to the source follower. It should be understood that the load current source 2311 could be provided upon the side of the image capturing chip 2113, or could be provided on the side of the signal processing chip 2111.

Now, the flow from the start of accumulation of electric charge to pixel output after the end of that accumulation will be explained. When reset pulses are applied to the reset transistors 2303 via the reset wiring of each of the blocks 2131 described above, and simultaneously transfer pulses are applied to the transfer transistors 2302 via the TX wiring of each of the blocks 2131 described above, then the electrical potentials of the PDs 2104 and the floating diffusions FD are reset for each of the blocks 2131 described above.

When the application of a transfer pulse to each of the PDs 2104 is canceled, the received light that is incident thereupon starts to be converted into electric change, which is accumulated. Thereafter, when a transfer pulse is applied again in the state in which no reset pulse is being applied, the accumulated electric charge is transferred to the floating diffusion FD, and the electrical potential of the floating diffusion FD becomes a signal electrical potential after charge accumulation from the reset electrical potential. And, when a selection pulse is applied to the selection transistor 2305 via the decoder wiring 2308, fluctuation of the signal electrical potential of the floating diffusion FD is transmitted to the output wiring 2309 via the amplification transistor 2304 and the selection transistor 2305. Due to this, a pixel signal corresponding to the reset electrical potential and to the signal electrical potential is outputted from the unit pixel to the output wiring 2309.

As described above, in this embodiment, reset wiring and TX wiring are provided in common for each of the four pixels that make up each of the blocks 2131. In other words, each reset pulse and each transfer pulse is applied simultaneously to all of the four pixels within the same block 2131. Accordingly, all of the pixels that make up one of the blocks 2131 start accumulation of electric charge at the same timing, and end accumulation of electric charge at the same timing. However, by selection pulses being applied in sequence to the respective selection transistors 2305, the pixel signals corresponding to the accumulated electric charges are selectively outputted from the output wiring 2309.

In this manner, in this embodiment, it is possible to control the timing of the start of charge accumulation for each of the blocks 2131 individually. To put it in another manner, it is possible to capture images at different timings for different ones of the blocks 2131.

Figure 26:
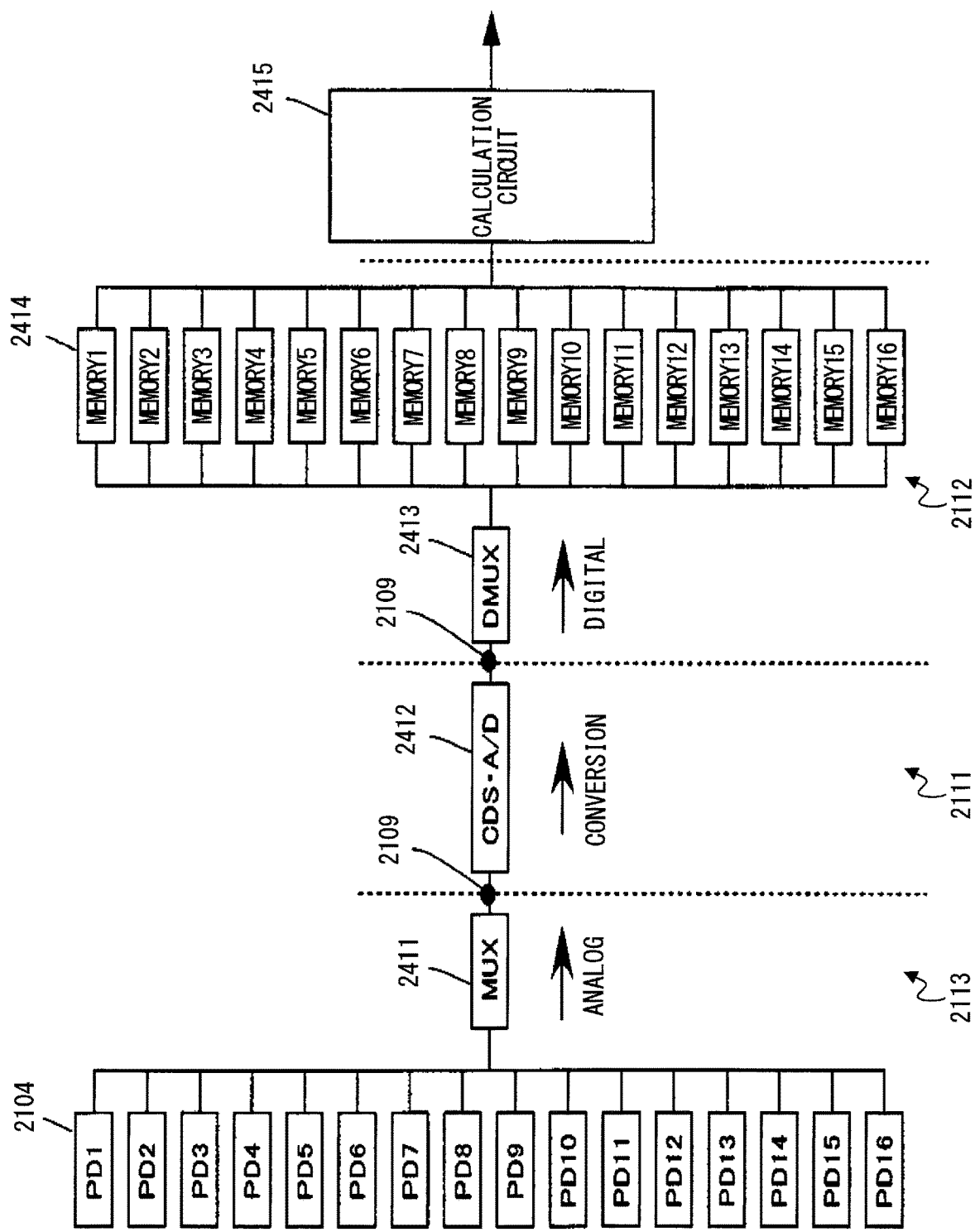
FIG. 26 is a block diagram showing the functional configuration of an image sensor.

FIG. 26 is a block diagram showing the functional structure of the image sensor 22. An analog multiplexer 2411 selects the sixteen PDs 2104 that make up a unit group 32 in order, and outputs the respective pixel signals to the output wiring 2309 that is provided to correspond to that unit group 32. This multiplexer 2411 is formed upon the image capturing chip 2113, along with the PDs 2104.

The pixel signals outputted via the multiplexer 2411 are subjected to correlated double sampling (CDS) and analog/digital (A/D) conversion by a signal processing circuit 2412 that is formed upon the signal processing chip 2111, and that performs correlated double sampling (CDS) and analog/digital (A/D) conversion. The pixel signals that have thus been A/D converted are transferred to a demultiplexer 2413, and are stored in pixel memories 2414 corresponding to the respective pixels. The demultiplexer 2413 and the pixel memories 2414 are formed upon the memory chip 2112.

After the calculation circuit 2415 processes the pixel signals stored in the pixel memories 2414, it transfers them to a subsequent stage image processing unit. The calculation circuit 2415 may be provided upon the signal processing chip 2111, or may be provided upon the memory chip 2112. It should be understood that while, in FIG. 26, the connections for a single unit group 32 are shown, actually these are provided for each of the unit groups 32, and operate in parallel. However, it will be acceptable for an individual calculation circuit 2415 not to be provided for each unit group 32; for example, it would also be acceptable to arrange for a single calculation circuit 2415 to perform sequential processing while referring to the values in the pixel memories 2414 corresponding to each unit group 32 in order.

As described above, output wiring 2309 is provided corresponding to each of the unit groups 32. Since, in the image sensor 22, the image capturing chip 2113, the signal processing chip 2111, and the memory chip 2112 are laminated together, accordingly, by electrically connecting between the chips by using the bumps 2109 in this output wiring 2309, it is possible to route the wiring without making the chips larger in the surface direction.

Figure 1:
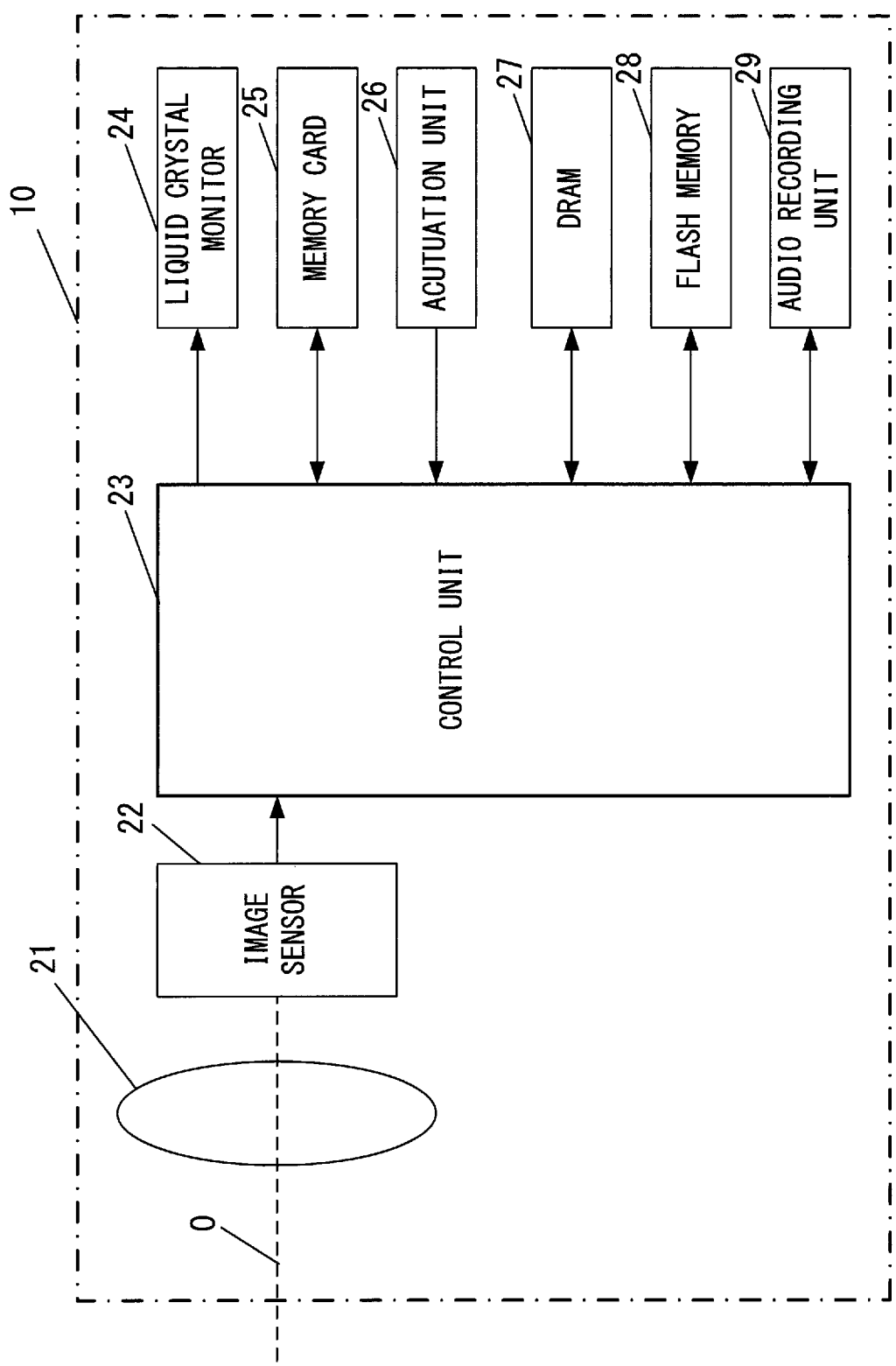
FIG. 1 is a block diagram showing the configuration of an image capturing device according to a first embodiment of the present invention.

FIG. 1 is a block diagram showing the configuration of an image capturing device according to a first embodiment of the present invention. An image capturing device 10 is a lens-integrated type camera. The image capturing device 10 includes an image capturing optical system 21, an image sensor 22, a control unit 23, a liquid crystal monitor 24, a memory card 25, an actuation unit 26, a DRAM 27, a flash memory 28, and a recording unit 29.

The image capturing optical system 21 is constituted by a plurality of lenses and forms a subject image upon an imaging surface of the image sensor 22. Note that in FIG. 1, the image capturing optical system 21 is shown as a single lens.

The image sensor 22 is an image sensor such as, for instance, CMOS or CCD, which picks up a subject image that is formed by the image capturing optical system 21 and outputs an imaging signal. The control unit 23, which is an electronic circuit that controls each unit of the image capturing device 10, includes a CPU and its peripheral circuit. The flash memory 28, which is a nonvolatile recording medium, has written therein a predetermined control program in advance. The control unit 23 reads the control program from the flash memory 28 and executes it to thereby control each unit. This control program uses the DRAM 27, which is a volatile recording medium, as a workspace.

The liquid crystal monitor 24 is a display device that has a liquid crystal panel. The control unit 23 allows the image sensor 22 to pick up a subject image repeatedly at a predetermined cycle (for instance, 1/60 second). Then, the image signal outputted from the image sensor 22 is subjected to various types of image processing to generate a so-called through-image or live view image, which is displayed on the liquid crystal monitor 24. On the liquid crystal monitor 24 is displayed, for instance, a setting screen, on which imaging parameters (imaging conditions) are to be set, as well as the through-image.

The control unit 23 generates an image file as described below based on an imaging signal that is outputted from the image sensor 22 and records the image file in the memory card 25, which is a portable recording medium. The actuation unit 26 has various types of actuation members, such as push buttons, and outputs actuation signals to the control unit 23 in response to the actuation of the actuation members. The recording unit 29, which is constituted by, for instance, a microphone, converts environmental sound into audio signal and inputs the audio signal into the control unit 23. Note that the image file 40 does not have to be recorded in the memory card 25 which is a portable recording medium, but may be recorded in a hard disk drive which is a recording medium, not shown in the figures, built-in in the image capturing device 10.

Figure 2:
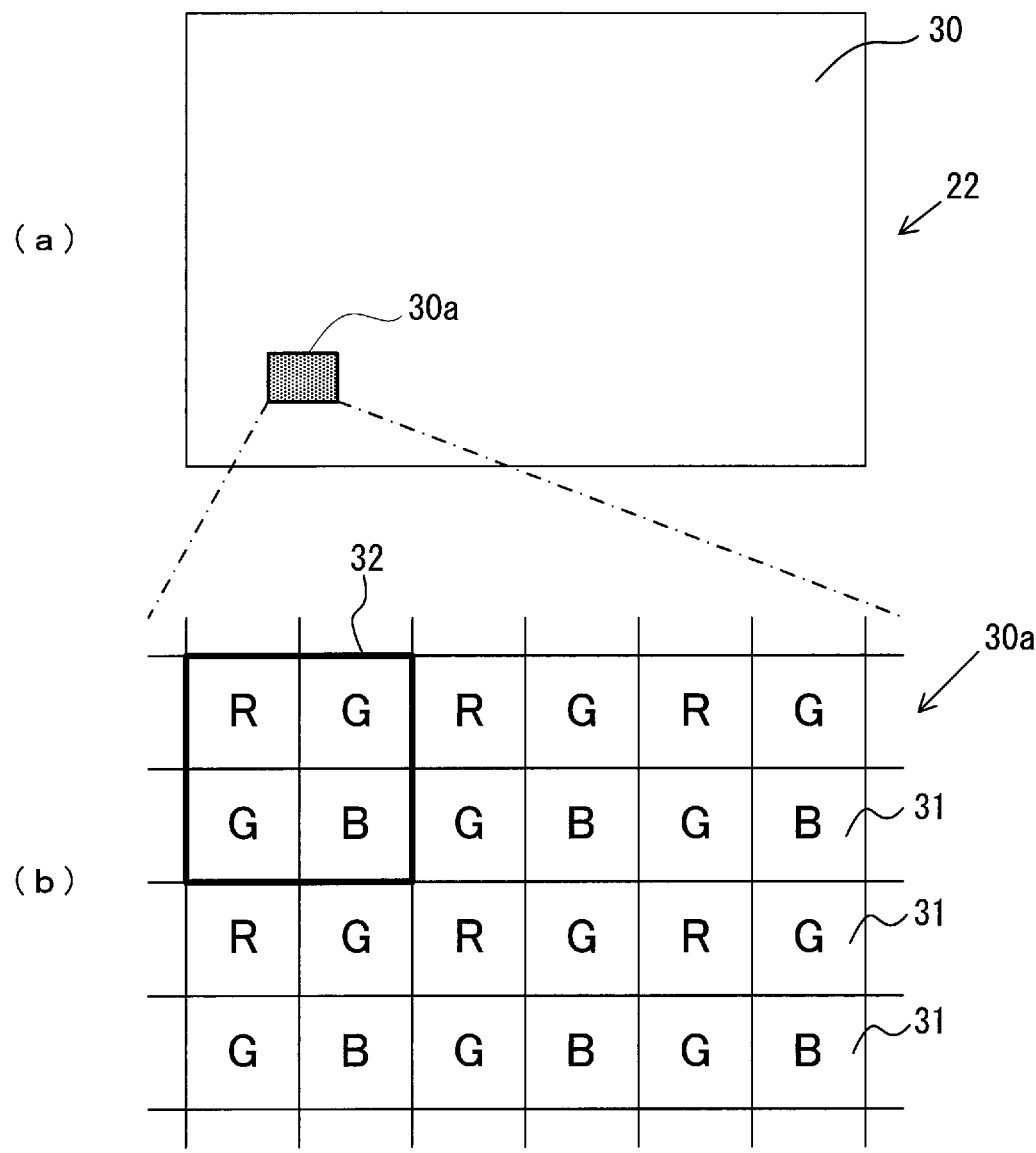
FIG. 2 shows plan views schematically showing the imaging surface of an image sensor.

FIG. 2(a) is a plan view schematically showing an imaging surface 30 of the image sensor 22. FIG. 2(b) is a plan view showing a partial region 30a of the imaging surface 30 in an enlarged scale. As shown in FIG. 2(b), a large number of imaging pixels 31 are arranged two-dimensionally on the imaging surface 30. The imaging pixels 31 have each a color filter, not shown in the figures. The color filters are of the three types, red (R), green (G), and blue (B) filters. In FIG. 2(b), notations "R", "G", and "B" represent the types of the color filters that the imaging pixels 31 have. As shown in FIG. 2(b), the imaging pixels 31 that have color filters of these types are arranged on the imaging surface 30 of the image sensor 22 according to a so-called Bayer array.

The imaging pixels 31 that have red filters photoelectrically convert light, among the incident light, of the red wavelength range into light reception signals (i.e., photoelectrical conversion signals) and output them. Similarly, the imaging pixels 31 that have green filters photoelectrically convert light, among the incident light, of the green wavelength range into light reception signals and output them. The imaging pixels 31 that have blue filters photoelectrically convert light, among the incident light, of the blue wavelength range into light reception signals and output them.

The image sensor 22 according to this embodiment is configured so as to enable its control for each of the unit group 32 made up from the four adjacent imaging pixels 31 in a 2×2 configuration, individually. With this configuration, it is possible to perform, when charge accumulation has started in, for instance, two mutually different unit groups 32, simultaneously, for one unit group 32, reading out of the charge, i.e., reading out of the light reception signals after 1/30 second from the start of the charge accumulation, while for the other unit group 32, reading out of the charge after 1/15 second after the start of the charge accumulation. In other words, it is possible to set at the image sensor 22 different exposure times (i.e., charge accumulation times, which are so-called shutter speeds) for each unit group 32 in a single imaging operation.

In addition to the above-described exposure time, it is also possible to set at the image sensor 22 different amplification factors of imaging signal (i.e., so-called ISO sensitivities) for different unit groups 32. The image sensor 22 can change timing at which charge accumulation is started and timing at which a light reception signal is read out for each unit group 32. That is, the image sensor 22 can change the frame rate upon image capturing a motion-image for each unit group 32.

When taken together, the image sensor 22 is configured to set exposure times, amplification factors, frame rates, and so on that are different for different unit groups 32, respectively. For instance, if a configuration is adopted in which a read out line, not shown in the figures, for reading out an imaging signal from a photoelectric conversion unit, not shown in the figures, of an imaging pixel 31 is provided at each unit group 32 such that an imaging signal can be read out from each unit group 32 independently of each other, different exposure times (shutter speeds) can be set for different unit groups 32, respectively. Also, if a configuration is adopted in which an amplification circuit, not shown in the figures, for amplifying an imaging signal generated with a photoelectrically converted charge is provided at each unit group 32 independently of each other such that the amplification factors of amplification circuits can be controlled for each amplification circuit, the amplification factors (ISO sensitivity) can be changed for each unit group 32, separately.

Note that the number of the imaging pixels 31 that constitute the unit group 32 is not limited to the above-mentioned four pixels in a 2×2 configuration. The unit group 32 may have at least one imaging pixel 31 and conversely may have more than four imaging pixels 31. The imaging conditions that can be set separately for different unit groups 32 may be those conditions other than the above-described ones. For instance, if a configuration is adopted in which the image sensor 22 is provided with a liquid crystal panel that has sections (of which one section corresponds to one unit group 32) such that they can be controlled for each unit group 32 independently of each other and such configuration is used as a neutral density filter that can be turned on/off, it is possible to control brightness (i.e., aperture value) for each unit group 32.

Figure 3:
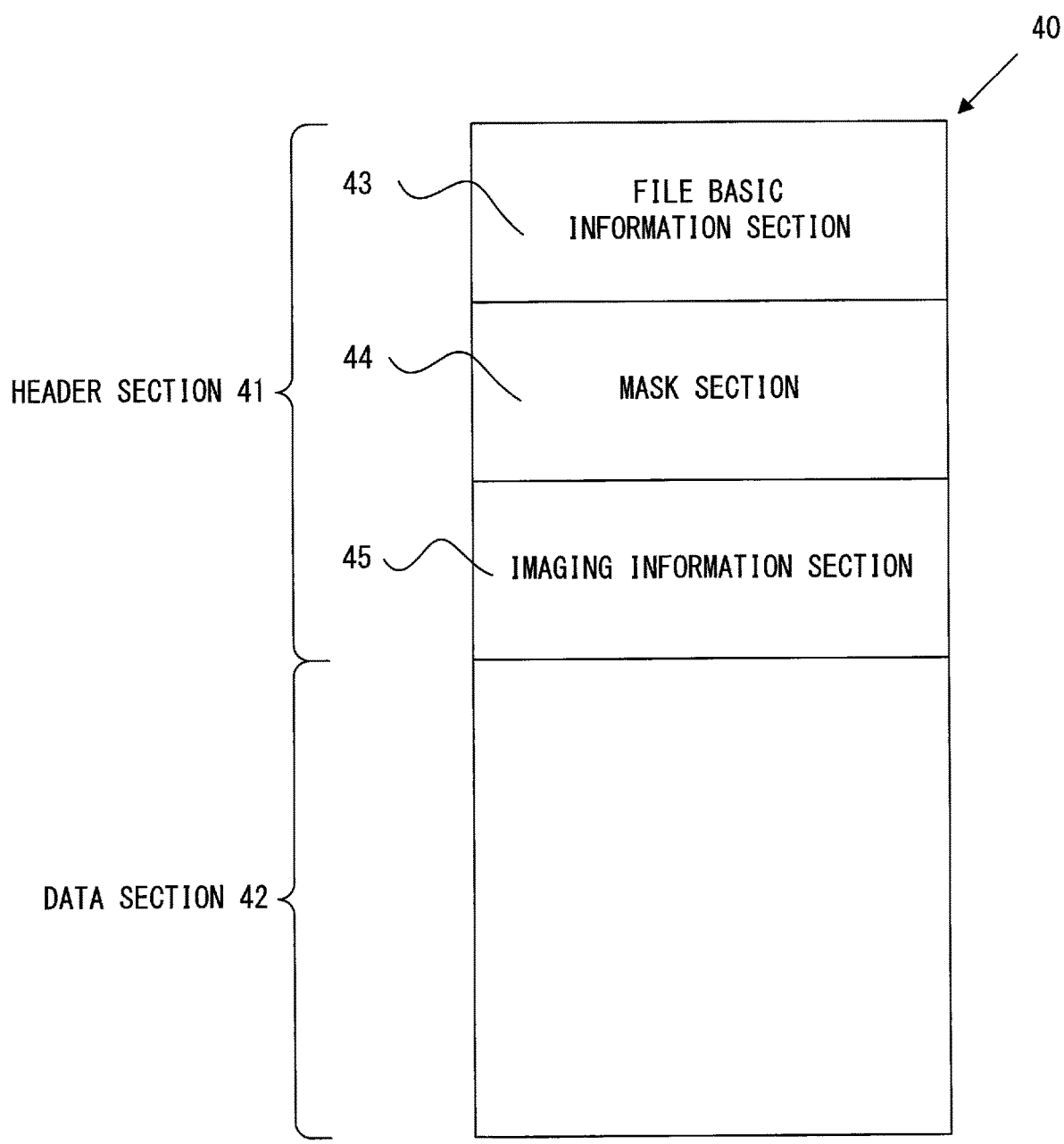
FIG. 3 is a schematic diagram showing the configuration of an image file according to an embodiment of the present invention.

Then, the image file 40 that is generated and recorded in the memory card 25 by the control unit 23 will be described below. FIG. 3 is a schematic diagram showing a configuration of the image file according to the embodiment of the present invention. The image file 40 is constituted by two blocks, i.e., a header section 41 and a data section 42.

The header section 41 is a block that is arranged on the head of the image file 40, in which file basic information section 43, a mask section 44, and an imaging information section 45 are stored in the order as described above. In the file basic information section 43, for instance, size and offset of each of the sections in the image file 40 (i.e., the header section 41, the data section 42, the mask section 44, the imaging information section 45 and so on) are recorded. In the mask section 44, imaging condition information, mask information and so on, which are described later, will be recorded. In the imaging information section 45, for instance, information about image capturing, such as model name of the image capturing device 10 and information about the image capturing optical system 21 (for instance, information about the optical property, such as aberration) will be recorded. In the data section 42, which is a block placed behind the header section 41, is recorded image information, audio information, and the like.

Then, explanation is made on image capturing functions that the image capturing device 10 has and on the image file 40 that is generated (recorded) by each image capturing function. The user can perform predetermined actuation to the actuation member of the actuation unit 26 to enable switching (selecting) each image capturing function as described below. The control unit 23 performs image capturing based on the selected image capturing function to generate the image file 40 and record it in the memory card 25.

(1) Still-Image Image Capturing Function A (Single Still-Image)

A still-image image capturing function A is a function to divide an image capture screen into a plurality of partial regions and set respective imaging conditions for the plurality of partial regions separately to allow image capturing of a still-image.

Figure 4:
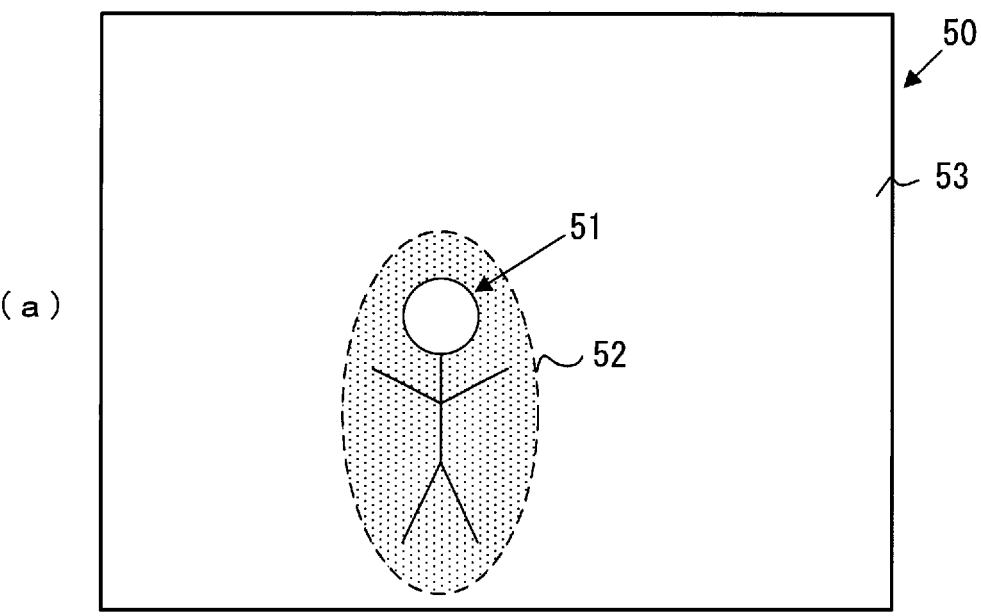
FIG. 4 shows illustrative diagrams for explaining a still-image image capturing function A.

FIG. 4(a) schematically shows an image capture screen 50 (an imaging range of the image sensor 22) and a subject 51. A procedure via which an image of the subject 51 that is shown in FIG. 4(a) is captured is explained. The control unit 23 takes an image of the subject 51 before main image capturing is performed. Hereafter, image capturing that is performed prior to main image capturing is referred to as preliminary image capturing. Note that the preliminary image capturing may also be performed as image capturing for generating a live view image (so-called through-image).

The control unit 23 executes predetermined image analysis processing on the image of the subject 51 acquired by preliminary image capturing (i.e., image in which the subject 51 comes out). The image analysis processing is a processing that detects a main subject part and a background part by using, for instance, a known subject detection technology (which is a technology that detects a range in which a predetermined subject is present by calculating an amount of characteristic). The image analysis processing achieves division of the image capture screen 50 into a main subject region 52 in which a main subject part is present and a background region 53 in which a background part is to present.

Note that in FIG. 4(a), a region that roughly includes the subject 51 is shown as the main subject region 52. However, the main subject region 52 may have a shape along an outline of the subject 51. That is, the main subject region 52 may be set so as to exclude things other than the subject 51 as much as possible.

The control unit 23 sets different imaging conditions for the unit groups 32 in the main subject region 52 and for the unit groups 32 in the background region 53. For instance, the control unit 23 may set a faster shutter speed for the former unit groups 32 than for the latter unit groups 32. With this setting, image blurring becomes difficult to occur in the main subject region 52 upon the main image capturing.

If the main subject region 52 is in a backlight state under the influence of a light source such as the sun that is present in the background region 53, the control unit 23 may set a relatively high ISO sensitivity or a relatively low shutter speed for the former unit groups 32. Also, the control unit 23 may set a relatively low ISO sensitivity or a relatively high shutter speed for the latter unit groups 32. With this setting, blocked up shadows in the main subject region 52 in a backlight state and blown out highlights of the background region 53 that receives a large amount of light can be prevented upon the main image capturing.

Note that the image analysis processing may be different from the processing that detects the above-mentioned main subject part and background part. For instance, it may be a processing that detects, among the whole image capture screen 50, a part having brightness equal to or higher than a predetermined value (too bright a part) and a part having brightness below a predetermined value (too dark a part). If the image analysis processing is such a processing, the control unit 23 may set a shutter speed and ISO sensitivity such that the unit groups 32 included in the former region can have an exposure value (Ev value) lower than that of the unit groups 32 in any other regions. On the other hand, the control unit 23 sets a shutter speed and ISO sensitivity such that the unit groups 32 included in the latter region can have an exposure value (Ev value) higher than those for the unit groups 32 included in any other regions. With this setting, the dynamic range of the image acquired by the main image capturing can be made broader than the original dynamic range of the image sensor 22.

Figure 5:
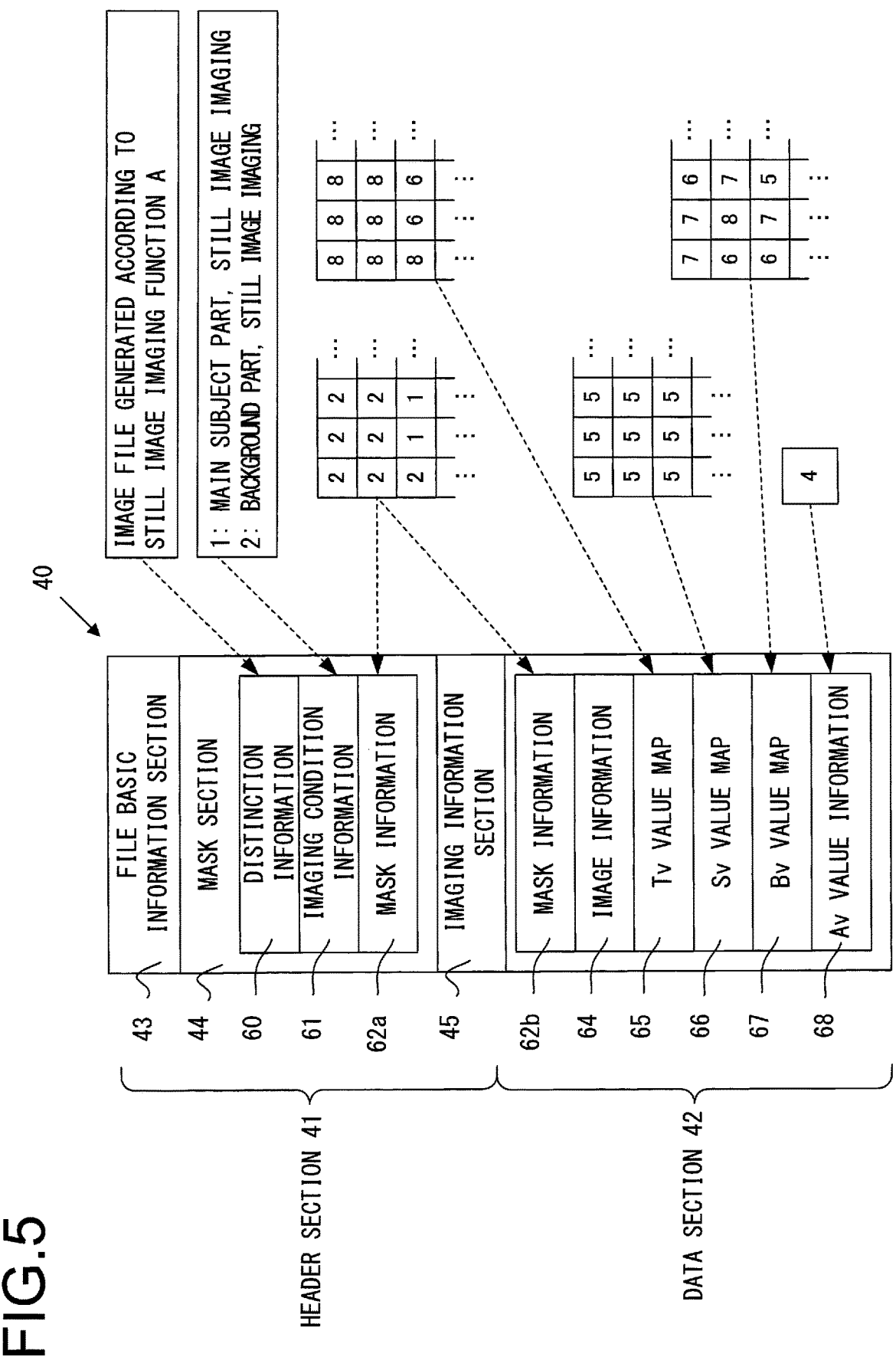
FIG. 5 is a diagram schematically showing the configuration of an image file that is generated upon performing image capturing using the still-image image capturing function A.

FIG. 5 is a diagram schematically showing a configuration of the image file 40 that is generated in case image capturing is performed by using the still-image image capturing function A. In the mask section 44 are recorded distinction information 60, imaging condition information 61 and mask information 62a in the above-described order. The distinction information 60 is information that indicates to the effect that this image file 40 is generated by using the still-image image capturing function A.

The imaging condition information 61 is information that indicates what uses (objects, roles) the unit groups 32 have. For instance, in case that the image capture screen 50 (FIG. 4(a)) is divided into the main subject region 52 and the background region 53 as described above, each of the unit groups 32 belongs to either the main subject region 52 or the background region 53. That is, each unit group 32 have either a use of performing "still-image image capturing of a main subject part" or a use of performing "still-image image capturing of a background part". The imaging condition information 61 is information that indicates that upon generation of this image file 40, the unit groups 32 have two types of uses, one for "still-image image capturing of a main subject part" and the other for "still-image image capturing of a background part" and that represents respective unique numbers allotted to these uses. For instance, the number 1 is allotted to the use of "still-image image capturing of a main subject part" and the number 2 is allotted to the use of "still-image image capturing of a background part".

The mask information 62a is information that represents uses (objects, roles) of the respective unit groups 32. In this embodiment, the mask information 62a is defined as information "expressed in the form of a two-dimensional map in which numbers allotted to the imaging condition information 61 are plotted in accordance with the positions of the unit groups 32". That is, when the unit groups 32 that are arranged two-dimensionally are identified by a two-dimensional coordinate ((x, y)) with two integers x and y, the unit group 32 that is present at the position of ((x, y)) has a use that is expressed by the number that is present at the position of ((x, y)) of the mask information 62a. For instance, when the number "1" is found to be present at the position of coordinate (3, 5) of the mask information 62a, it is found that the unit group 32 arranged at the coordinate (3, 5) is given a use of "still-image image capturing of a main subject part". In other words, it is found that the unit group 32 arranged at the coordinate (3, 5) belongs to the main subject region 52.

An example of the mask information 62a that corresponds to the image capture screen 50 as shown in FIG. 4(a) is shown in FIG. 4(b). At the positions of the unit groups 32 that belong to the main subject region 52, "1" is stored. Also, at the positions of the unit groups 32 that belong to the background region 53, "2" is stored.

In the data section 42 are stored mask information 62b, image information 64, a Tv value map 65, a Sv value map 66, a Bv value map 67, and an Av value information 68 in the above-described order. The mask information 62b is the same information as the mask information 62a that is stored in the mask section 44. Here, the reason that the same mask information 62a, 62b is stored in both the mask section 44 and the data section 42 is to make it easy to handle the image file 40.

Although details is described later, pieces of mask information 62a, 62b that are different from each other may be stored in the mask section 44 and in the data section 42, respectively, in the case of the image file 40 that is generated by another function. If, for instance, the mask information 62b is stored in the data section 42 and no mask information 62a is stored in the mask section 44 in the still-image image capturing function A, the structure of the image file 40 changes depending on the functions. This configuration makes it cumbersome and complicated to handle the image file 40. Accordingly, in this embodiment, the same pieces of mask information 62a, 62b are stored in both the mask section 44 and the data section 42 purposely to minimize a difference in structure of the image file 40 for each of the functions. Note that either one of pieces of the mask information 62a, 62b may be omitted. If omitted, the size of the storage region occupied by the image file 40 can be reduced. Even if both the pieces of mask information 62a, 62b are recorded, it can be determined whether it is necessary to read in both the pieces of mask information 62a, 62b based on distinction information. Thus, if it is determined that one of them is unnecessary for a reproduction process and so on, then reading in of such one may be skipped to shorten file read-in time.

Note that in the explanation below, the mask information 62a that is stored in the mask section 44 and the mask information 62b that is stored in the data section 42 are collectively called mask information 62.

The image information 64 is information that is generated by recording imaging signals that are output from the image sensor 22 upon main image capturing before they are subjected to various types of image processing. This information is so-called RAW image data. The Tv value map 65 is information that is expressed in the form of a two-dimensional map generated by plotting Tv values representing shutter speeds that are set for respective unit groups 32 in accordance with the positions of the unit groups 32. For instance, the shutter speed that is set for the unit group 32 arranged at the coordinate (x, y) can be determined by checking the Tv value stored at the coordinate (x, y) in the Tv value map 65.

The Sv value map 66 is information that is expressed in the form of a two-dimensional map generated by plotting Sv value representing ISO sensitivity that is set for each of the unit groups 32 in the same manner as that in the case of the Tv value map 65. The Bv value map 67 is information that is expressed in the form of a two-dimensional map generated by plotting luminance of the subject that is measured for each of the unit groups 32 upon main image capturing. That is, it is information that is expressed in the same form as the Tv value map 65 by plotting Bv values representing luminance of subject light incident in each of the unit groups 32. The Av value information 68 is information that represents aperture value upon main image capturing. In this embodiment, Av values, which are different from the Tv values, the Sv values, and the Bv values, are not present for each of the unit groups 32 separately. Therefore, unlike the Tv value, Sv value, and Bv value, only a single value is stored for the Av value, so that it is different from the information that is formed by two-dimensionally mapping a plurality of values.

As described above, the control unit 23 performs image capturing by using the still-image image capturing function A and thereby records in the memory card 25 the image file 40 in which the image information 64 that is generated by the image sensor 22 capable of setting respective imaging conditions for the unit groups 32 are correlated with data relating to the respective imaging conditions for the unit groups 32 (i.e., the imaging condition information 61, the mask information 62, the Tv value map 65, the Sv value map 66, and the Bv value map 67 and so on).

Note that in the above explanation, the image information 64 is explained as being RAW image data. However, it need not be RAW image data but may be compressed (developed) image data.

(2) Motion-Image Image Capturing Function A (Single Motion-Image)

The motion-image image capturing function A is a function according to which the image capture screen is separated into a plurality of partial regions and imaging conditions are set therefor individually to perform imaging of a motion-image. The motion-image image capturing function A differs from the still-image image capturing function A in that the former performs image capturing of a motion-image but not a still-image. To perform image capturing of a motion-image instead of a still-image, there is the possibility that "uses of respective unit groups 32" described regarding the still-image image capturing function A may be changed frame by frame.

FIG. 6(a) schematically shows the image capture screen 50 (imaging range) of the image sensor 22 and the subject 51. The control unit 23 performs preliminary image capturing prior to main image capturing. Then, the control unit 23 executes predetermined image analysis processes on the image of the subject 51 (image in which the subject 51 comes out) acquired by the preliminary image capturing. By the image analysis processes, the image capture screen 50 is divided into a main subject region 52 in which a main subject part is present and a background region 53 in which a background part is present. The control unit 23 sets imaging conditions different from each other for the unit groups 32 in the main subject region 52 and for the unit groups 32 in the background region 53 and performs main image capturing for a first frame to generate image data. An example of mask information 62 in this case is shown in FIG. 6(b). In the mask information 62 shown in FIG. 6(b), for example, the number "1" is allotted to the unit groups 32 belonging to the main subject region 52 and the number "2" is allotted to the unit groups 32 belonging to the background region 53.

Then, the control unit 23 performs image analysis processes on the first frame image data to detect a main subject part and a background part. As a result, the first frame image data is divided into the main subject region 52 and the background region 53 as shown in FIG. 6(c). The control unit 23 sets imaging conditions that are different from each other for the unit groups 32 in the main subject region 52 and for the unit groups 32 in the background region 53 and performs a second frame main image capturing to generate image data. An example of the mask information 62 in this case is shown in FIG. 6(d).

Comparing the mask information 62 (FIG. 6(b)) corresponding to the result of the preliminary image capturing with the mask information 62 (FIG. 6(d)) corresponding to the result of the first frame main image capturing, these two pieces of mask information 62 may sometimes have contents different from each other in case, for instance, the subject 51 is moving or the user moves the image capturing device 10 because imaging is performed at different times (i.e., because of presence of time lag). In other words, the mask information 62 is dynamic information that varies with lapse of time. Therefore, in some of the unit groups 32, imaging conditions that are different from each other will be set at the times of the first frame main image capturing and the second frame main image capturing.

The control unit 23 records, in the image file 40, the mask information 62b, the Tv value map 65, the Sv value map 66, the Bv value map 67, and the Av value information 68 for each frame as well as the image information 64 for each frame. Therefore, after image capturing, all the information upon image capturing can be acquired from the image file 40 and utilized effectively in reproduction of motion-images.

Note that the processes upon third and subsequent frames main image capturing are the same as the processes for the second frame and explanation thereof will be omitted here. The control unit 23 repeatedly perform the above-mentioned processes until image capturing is completed (for instance, until a predetermined time is elapsed or until the user performs a predetermined imaging termination actuation).

Figure 7:
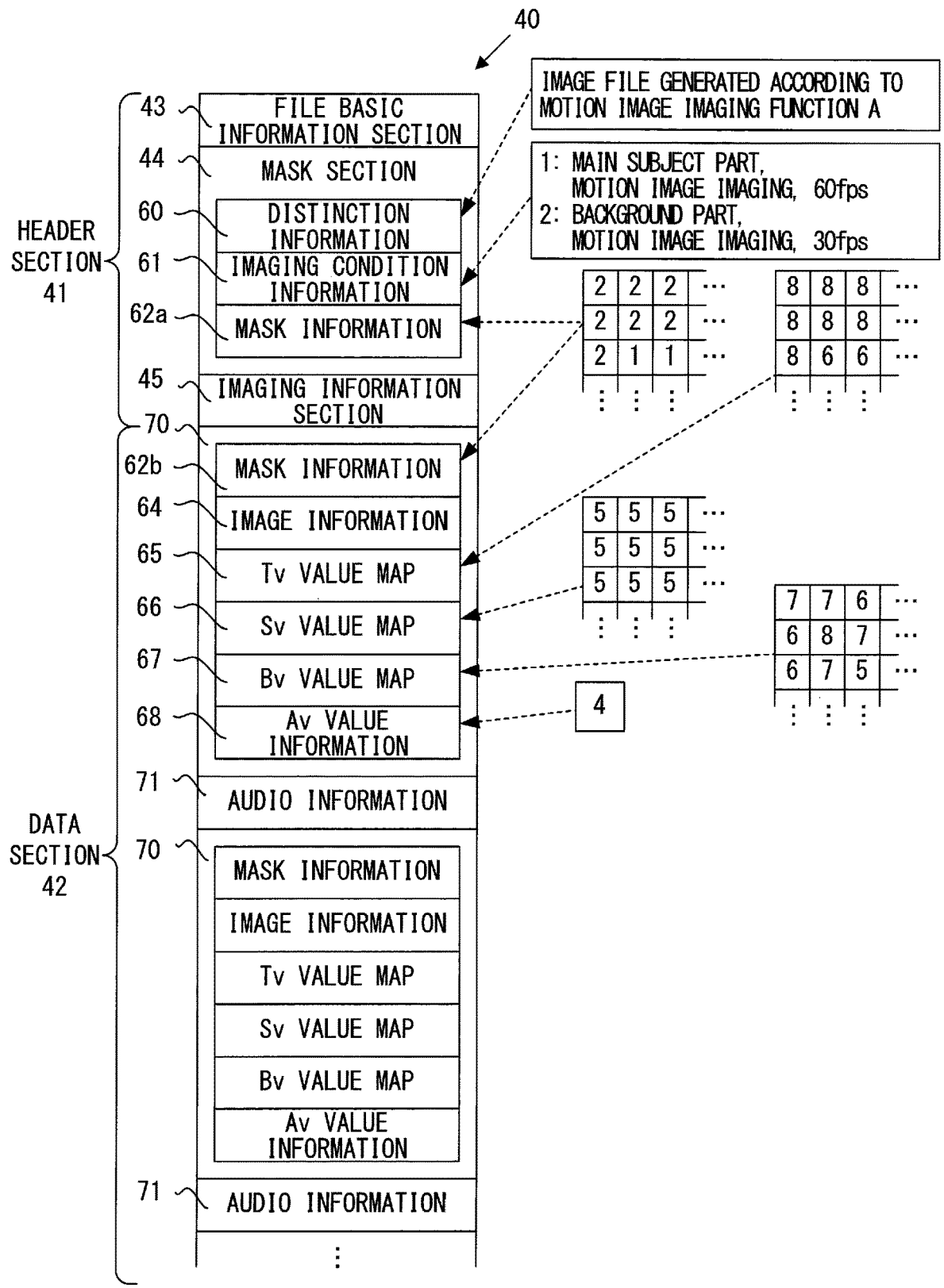
FIG. 7 is a drawing schematically showing the configuration of an image file that is generated upon performing image capturing using the motion-image image capturing function A.

FIG. 7 is a diagram schematically showing a configuration of the image file 40 that is generated when image capturing is performed by using the motion-image image capturing function A. Hereafter, differences from image capturing by using the still-image image capturing function A as shown in FIG. 5 will be described in detail.

The distinction information 60 indicates that the image file 40 is generated by using the motion-image image capturing function A. The imaging condition information 61 corresponds to the imaging condition information 61 upon imaging by using the still-image image capturing function A plus a frame rate. That is, the imaging condition information 61 is information that indicates that upon generation of the image file 40, the unit groups 32 have two types of uses, for instance, one for performing "motion-image image capturing of a main subject part at 60 fps" and the other for performing "motion-image image capturing of a background part at 30 fps" and that represents unique numbers allotted to the respective uses. For instance, the number "1" is allotted to the use of performing "motion-image image capturing of a main subject part at 60 fps" and the number "2" is allotted to the use of performing "motion-image image capturing of a background part at 30 fps".

The mask information 62a is information similar to that upon image capturing by using the above-mentioned still-image image capturing function A. However, upon the motion-image image capturing, the mask information 62, which is dynamic information that varies frame by frame, need be determined as to which frame is to be selected for recording its mask information 62 in the header section 41. In this embodiment, the mask information 62a representing respective imaging conditions that are set for the unit groups 32 at the first frame image capturing, that is, the mask information 62 that is shown as an example in FIG. 6(b) are recorded in the header section 41. This configuration is adopted to prevent handling of the image file 40 from becoming cumbersome and complicated as described in the explanation of the still-image image capturing function A.

In the data section 42, a block 70 for one frame quota is stored for each frame in the order of image capturing. A single block 70 includes the mask information 62, the image information 64, the Tv value map 65, the Sv value map 66, the Bv value map 67, and the Av value information 68. In the data section 42, audio information 71 is stored together with the respective blocks 70 for the frames. To enable easy motion-image reproduction, the audio information 71 is divided into a plurality of pieces of information each containing information for one frame quota, each of which pieces is multiplexed with a corresponding block 70 before the divided and multiplexed pieces of information can be stored in the data section 42. Note that multiplexing of the audio information 71 may be performed for every predetermined number of frame quotas instead of one frame quota. Each of the pieces of information in the block 70 is recorded frame by frame. Except for this, the image capturing by using the motion-image image capturing A is the same as the image capturing by using the still-image image capturing function A and further explanation is omitted.

As described above, the control unit 23 performs image capturing by using the motion-image image capturing function A to thereby record, in the memory card 25, the image file 40 in which the image information 64 that is generated by the image sensor 22 for which imaging conditions for each of the unit groups 32 can be set and data relating to imaging conditions (imaging condition information 61, mask information 62, Tv value map 65, Sv value map 66, and Bv value map 67 and so on) for each of the unit groups 32 are correlated with each other.

(3) Still-Image Image Capturing Function B (a Plurality of Still-Images)

The still-image image capturing function B is a function of simultaneously image capturing a plurality of still-images relating to the same subject under imaging conditions differing from each other by single image capturing operation.

FIG. 8(a) schematically shows an imaging surface 30 of the image sensor 22. On the other hand, FIG. 8(b) is a schematic diagram showing a partial region 30b of the imaging surface 30 in an enlarged view. In the case of the still-image image capturing function B, a plurality of unit groups 32 arranged in a two-dimensional array are further classified into a plurality of large groups 81. On this occasion, the unit groups 32 are classified such that unit groups 32 that belong to any one of the large groups 81 are arranged uniformly over all the imaging surface 80. For instance, in FIG. 8(b), all the unit groups 32 are divided into blocks 82, each of which includes 4 unit groups 32 arranged in a 2×2 configuration; in each block 82, the upper left unit group 32 is classified into a first large group 811, the lower left unit group 32 is classified into a second large group 812, the upper right unit group 32 is classified into a third large group 813, and the lower right unit group 32 is classified into a fourth large group 814. Note that in FIG. 8(b), one schematically shown square represents a single unit group 32. The number described in the square represents the kind of the large group 81 to which that unit group 32 belongs.

Upon main image capturing, the control unit 23 sets respective imaging conditions that differ from each other for the unit groups 32 that belong to the first large group 811, the unit groups 32 that belong to the second large group 812, the unit groups 32 that belong to the third large group 813, and the unit groups 32 that belong to the fourth large group 814. For instance, the control unit 23 performs main image capturing with the shutter speed and ISO sensitivity set to values differing from each other. The control unit 23 records the image information acquired by performing image capturing in this manner in the image file 40. Here, the recorded image information is intended such that each pixel value is aggregated for each of the large groups 81 for further use as schematically shown in FIG. 8(c).

For instance, as shown in FIG. 8(c), when only those pixel values that correspond to the unit groups 32 belonging to the first large group 811 are extracted from the image information 64 and arranged in a two-dimensional array, first image information 641 consisting of a number of pixel values, which number is ¼ times the number of pixels of the image sensor 22, is obtained. Similarly, when only those pixel values that correspond to the unit group 32 belonging to the second large group 81 are extracted from the image information 64 and arranged in a two-dimensional array, second image information 642 is obtained, which consists of a number of pixel values, which number is ¼ times the number of pixels of the image sensor 22 and in which the same subject 51 as that in the first image information 641 whose image has been captured under imaging conditions different from the above-mentioned first image information 641 comes out. Similarly, third image information 643 and fourth image information 644 are obtained. These four pieces of image information 641, 642, 643, and 644 are images obtained by image capturing the same subject 51 under imaging conditions differing from each other. That is, as mentioned first, a single imaging operation achieves simultaneous imaging of four still-images regarding the same subject 51 under imaging conditions differing from each other.

Note that the image information 64 in the image file 40 is an image obtained by arranging pixels output from respective imaging pixels 31 just according to the positions of the imaging pixels 31. That is, the processes for generating the above-mentioned four pieces of image information 641, 642, 643, and 644 are performed upon reproduction in which the image file 40 is read out from the memory card 25 or upon development. Furthermore, the image information 64 is not necessarily intended to be used only for generating the four pieces of image information 641, 642, 643, and 644. If the image information 64 is used (reproduced, etc.) as it is, without generation of a plurality of pieces of divided information, then, for instance, a checkerboard pattern comes out in the resultant image to make the image unnatural due to imaging conditions that differ from each of the adjacent unit groups 32, respectively. However, since respective imaging conditions (for instance, Tv value, Sv value, etc.) for each of the unit groups 32 are recorded in the image file 40, development by combining such imaging conditions with the image information 64 enables generation of such unnatural images to be prevented. For instance, for the unit groups 32 that have an exposure value (Ev value) higher than other unit groups 32, development may be performed at a luminance that is lower than other unit groups 32.

The example in which the unit groups 32 are classified into four large groups 811, 812, 813, and 814 has been explained above. However, the way of classifying the unit groups 32 is not limited to four large groups but the unit groups 32 may be classified into any desired number of large groups 81 to enable simultaneous image capturing of any desired number of still-images. Furthermore, the layout of large groups 81 (method of classifying the unit groups 32) is not limited to classifying the unit groups 32 in a 2×2 configuration into different large groups 81, respectively, one by one.

In this regard, some examples are shown in FIGS. 9(*a*), and 9(*b*). In FIG. 9(*a*), all the unit groups 32 are separated into any of sets including nine unit groups in a 3×3 configuration and nine unit groups 32 included in each of the sets are allotted to first to ninth large groups 81, respectively. By adopting this layout, simultaneous image capturing of nine images 641 to 649 under mutually different imaging conditions can be achieved by a single imaging operation. On the other hand, in FIG. 9(*b*), all the unit groups 32 are separated any of sets including nine unit groups in a 3×3 configuration and in each of the sets, the unit group 32 at the upper left corner is allotted to the first large group 81, and four unit groups 32 in a 2×2 configuration at the lower right are allotted to the second large group 81. In this layout, the rest four unit groups 32 are not used in image capturing. With this configuration, a single image capturing operation enables simultaneous imaging of two images 641, 642 under different imaging conditions, with the image 642 corresponding to the second large group 81 having a pixel number that is 4 times as large as the image 641 corresponding to the first large group 81. That is, a single imaging operation enables simultaneous imaging of two images 641, 642 under different imaging conditions, with the two images 641, 642 having mutually different pixel numbers.

Figure 10:
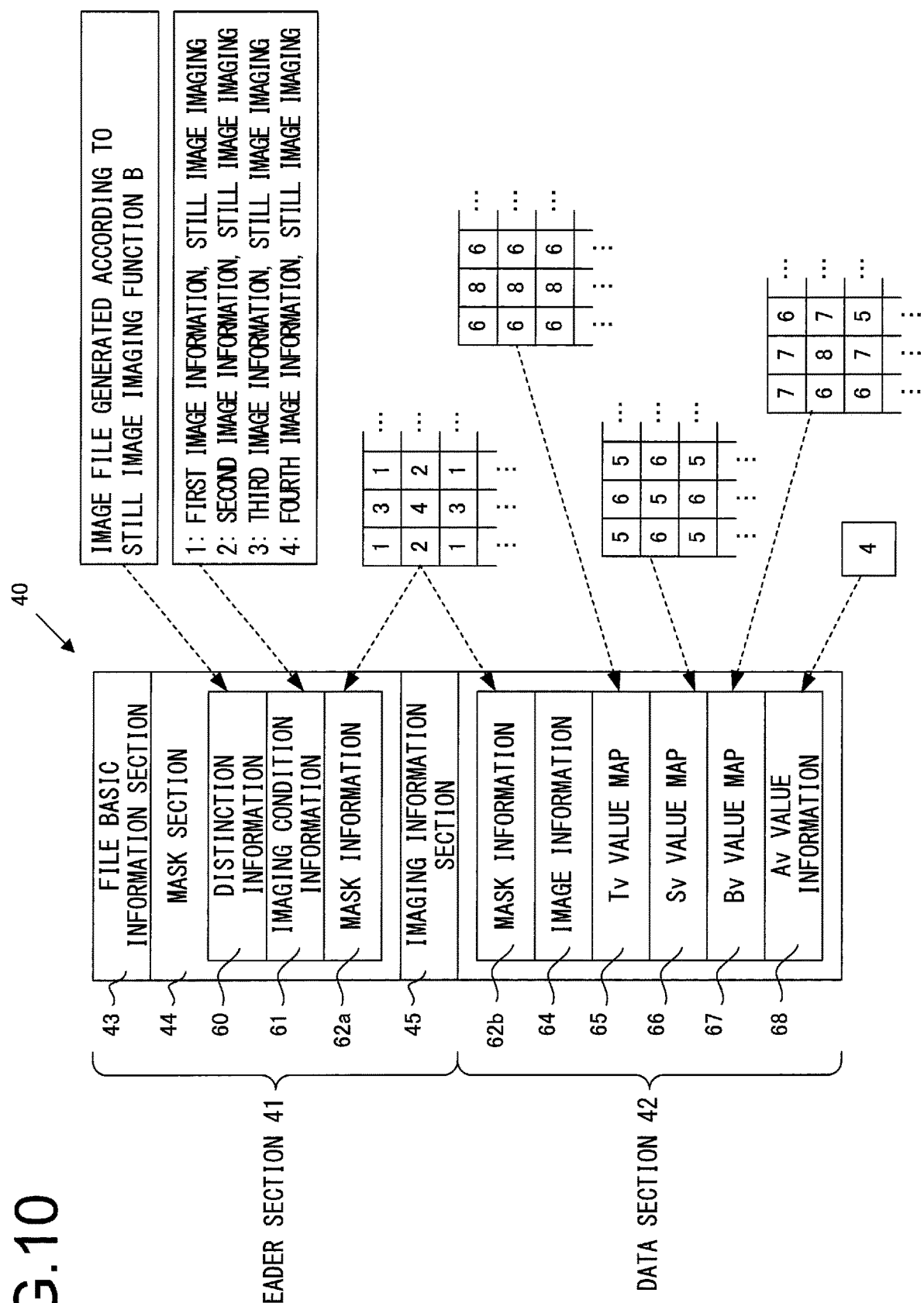
FIG. 10 is a diagram schematically showing the configuration of an image file that is generated upon performing image capturing using the still-image image capturing function B.

FIG. 10 is a diagram schematically showing a configuration of the image file 40 that is generated upon imaging by using the still-image image capturing function B. Hereafter, differences of the still-image image capturing function B from the still-image image capturing function A will be described in detail.

The distinction information 60 indicates that the image file 40 is generated by using the still-image image capturing function B. The imaging condition information 61 is information that indicates which use the unit group 32 has. In the case of the still-image image capturing function B, each unit group 32 has any one of uses, for instance, a use of "configuring the first image information 641", a use of "configuring the second image information 642", a use of "configuring the third image information 643", and a use of "configuring the fourth image information 644". The imaging condition information 61 is information that indicates that upon generating this image file 40, these four kinds of uses are present in the unit groups 32 and that represents unique numbers allotted to the respective uses. For instance, numbers 1 to 4 are allotted to uses of "configuring first to fourth image information 641 to 644", respectively.

In the case of the still-image image capturing function B, the mask information 62*a* is information represents a use of each of the unit groups 32 in the same manner as that in the case of the still-image image capturing function A. That is, the mask information 62*a* is "information expressed in the form of a two-dimensional map that is generated by plotting the numbers allotted to the imaging condition information 61 in accordance with the position of each unit group 32". For instance, when the number "1" is present at the coordinate (3, 5) of the mask information 62*a*, the unit group 32 at the coordinate (3, 5) belongs to the first large group 811, that is, constitutes the first image information 641.

Note that in this embodiment, the large group 81 that has a number of "0" is a special large group 81 that represents a unit group 32 that is not used in image capturing. That is, in the mask information 62*a* the unit groups 32 to which the number "0" is allotted are not used in image capturing (i.e., no imaging signal is read out upon main image capturing) and no information about the unit groups 32 is included in the image information 64 that is recorded in the data section 42 (or dummy information which is ineffective is recorded as information about the unit groups 32).

Figure 8:
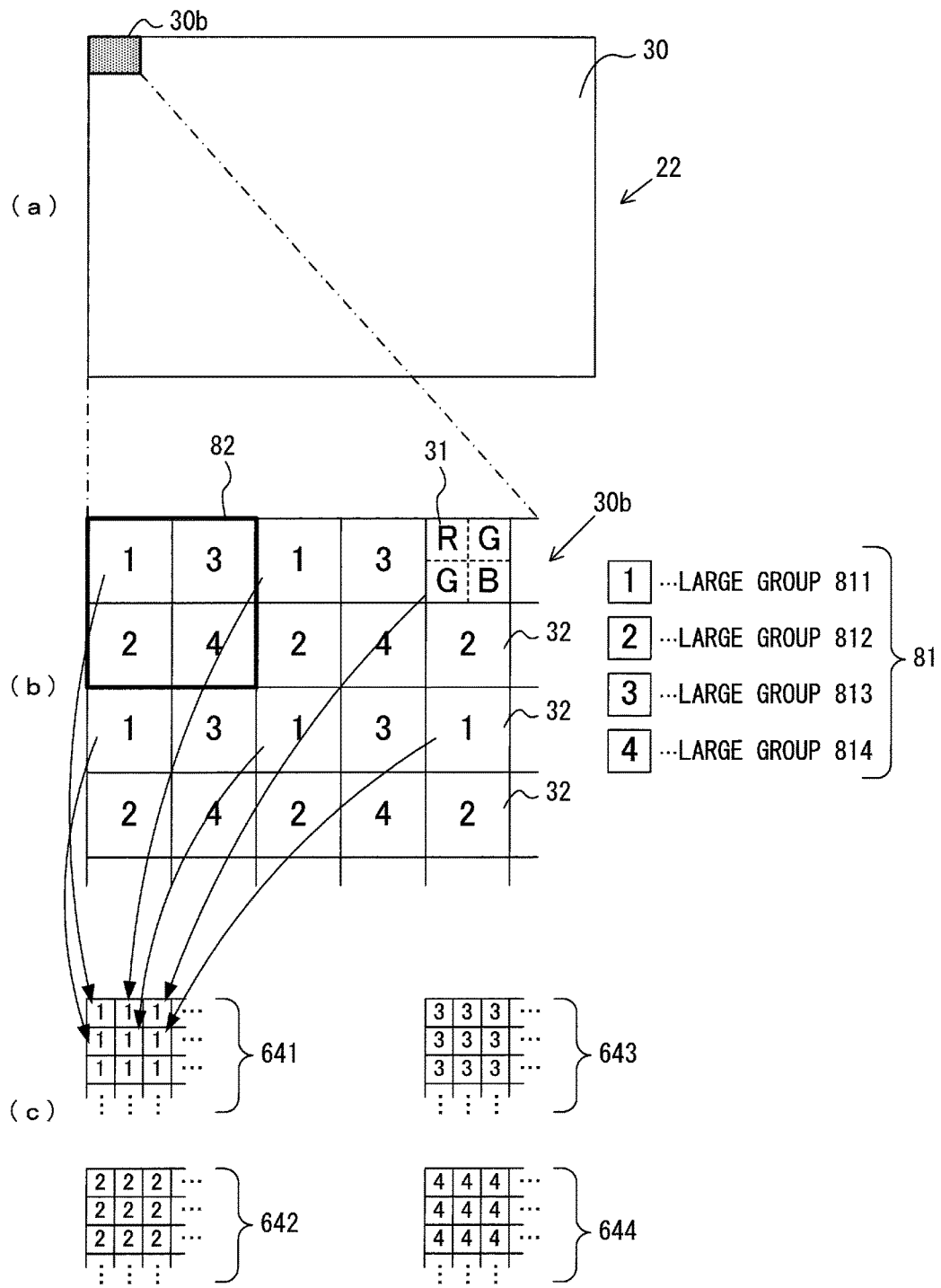
FIG. 8 shows illustrative diagrams for explaining a still-image image capturing function B.

For instance, in case that simultaneous image capturing under three kinds of different imaging conditions is sufficient and simultaneous image capturing under four kinds of different imaging conditions is unnecessary, the number "0" will be allotted to the mask information 62*a* of the unit groups 32 to which "4" is allotted among the unit groups 32 shown in FIG. 8(*b*).

The structure of the data section 42 is the same as that of the data section 42 in image capturing by using the still-image image capturing function A. That is, in the data section 42 are stored the mask information 62*b*, the image information 64, the Tv value map 65, the Sv value map 66, the Bv value map 67, and the Av value information 68. The mask information 62*b* is the same information as the mask information 62*a* that is stored in the mask section 44.

Note that information that represents validity/invalidity of each of the unit groups 32 may be stored as the mask information 62*b* instead of the information that is the same as the mask information 62*a* of the mask section 44. For instance, a map generated by allotting a numerical value of "0" to the unit groups 32 that are not used in image capturing (i.e., from which no imaging signal is read out upon image capturing) and a numerical value of "1" to the unit groups 32 that are used in image capturing (i.e., from which an imaging signal is read out upon image capturing) and arranging these numerical values in the form of a two-dimensional array may be stored in the data section 42 as the mask information 62*b*. The same is true for image capturing by using a motion-image image capturing function B or a mixed image capturing function as described later.

As described above, the control unit 23 performs imaging by using the still-image image capturing function B to record, in the memory card 25, the image file 40 in which the image information 64 generated by the image sensor 22 for which imaging conditions can be set for each of the unit groups 32 separately is correlated with data relating to the imaging conditions (the imaging condition information 61, the mask information 62, the Tv value map 65, the Sv value map 66, the Bv value map 67, etc.) for each of the unit groups 32.

(4) Motion-Image Image Capturing Function B (a Plurality of Motion-Images)

The motion-image image capturing function B is a function that performs simultaneous imaging of motion-images relating to the same subject by a single imaging operation under mutually different imaging conditions. The motion-image image capturing function B differs from the still-image image capturing function B in that according to the former, motion-images are captured instead of still-images. Although the motion-image image capturing function B is a function of capturing motion-images, some unit groups 32 that are classified into a certain large group 81 are not classified into different large groups 81 frame by frame as in the motion-image image capturing function A. However, depending on the setting of frame rates, it may happen that the unit group 32 that is included in one frame (i.e., that is valid in one frame) is not included in another frame (i.e., is invalid in another frame). Hereafter, the motion-image image capturing function B will be explained based on the setting of frame rate.

(4-1) When Frame Rates are Unified in all the Large Groups 81

Figure 11:
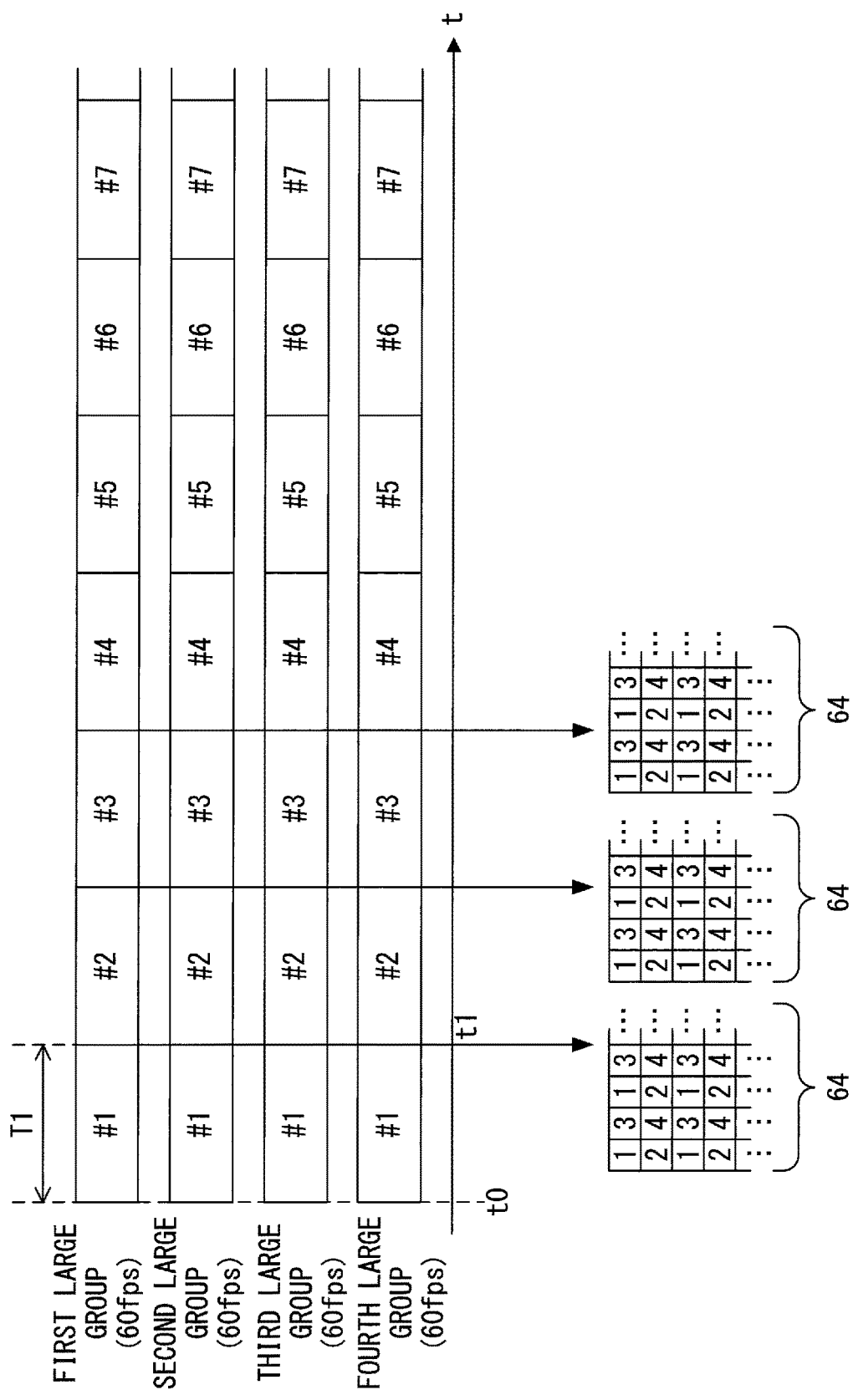
FIG. 11 is an illustrative diagram for explaining a motion-image image capturing function B.

FIG. 11 is an illustrative diagram of the motion-image image capturing function B when frame rates are the same in all the large groups 81. In this case, the imaging conditions that differ for each of the large groups 81 means imaging conditions other than frame rate (for instance, shutter speed, ISO sensitivity, etc.). Even if the exposure time is different for each of the large groups 81, the frame rate, i.e., the period at which signals are read out, is the same. Hence in all the large groups 81, reading out of imaging signals is performed at a predetermined cycle T1 that corresponds to the frame rate.

Since imaging is performed at the same frame rate in all the unit groups 32, all the unit groups 32 are used in image capturing for all the frames. In other words, in all the frames, an imaging signal is read out from all the unit groups 32 and the imaging signals that are read out from all the unit groups 32 are included in pieces of the image information 64 of all the frames, respectively. For instance, first image information 64 is generated at time t1, which is by a predetermined period T1 later than an image capturing start time t0. The image information 64 includes an image of a first frame in the first large group 81 (i.e., the frame indicated with #1 in FIG. 11, hereafter, the same), an image of the first frame in the second large group 81, an image of the first frame in the third large group 81, and an image of the first frame in the fourth large group 81. The same is true for the second and subsequent pieces of image information 64.

(4-2) when Frame Rates are not Unified for Each of Large Groups 81

Figure 12:
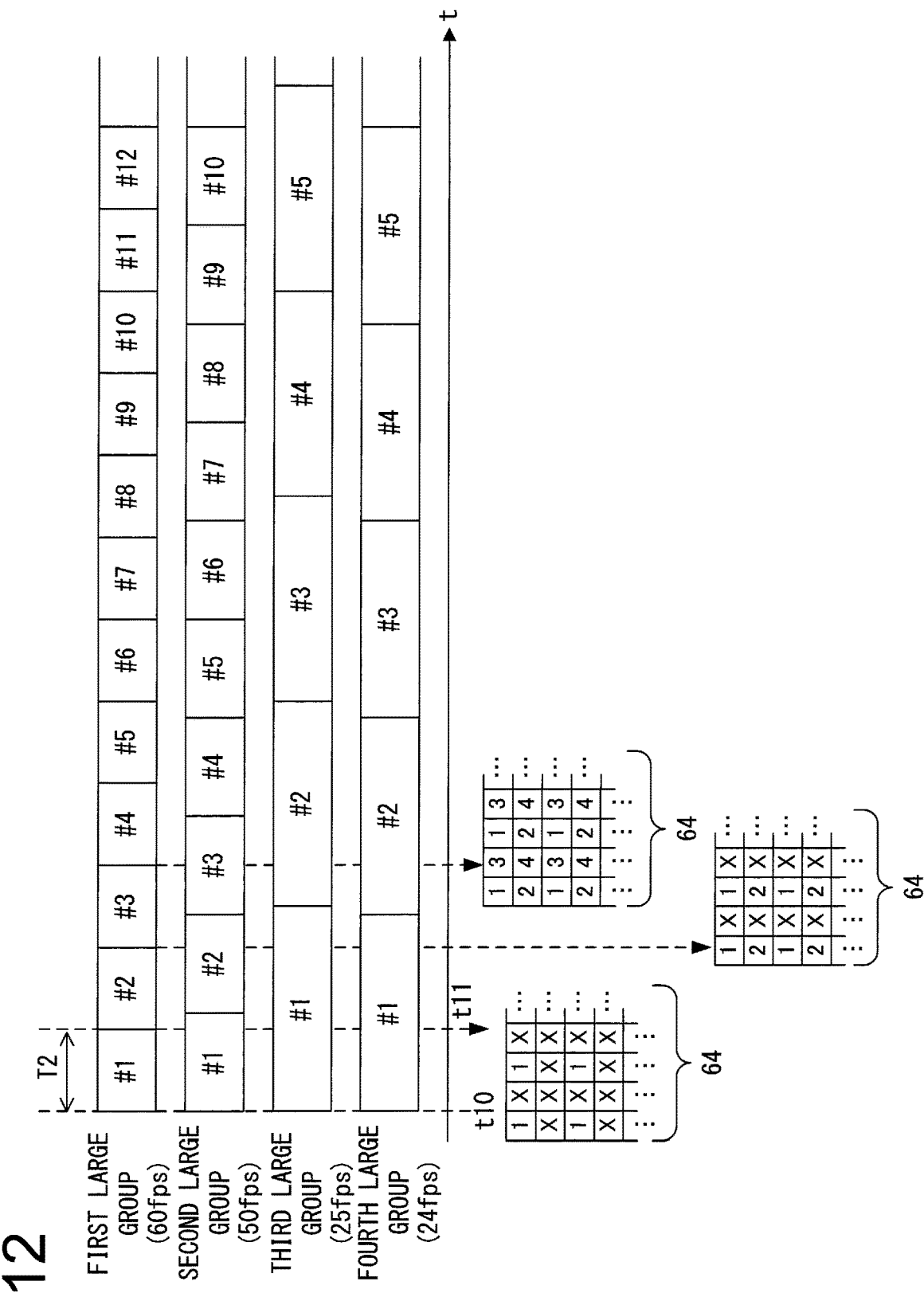
FIG. 12 is an illustrative diagram for explaining a motion-image image capturing function B.

FIG. 12 is an illustrative diagram of the motion-image image capturing function B when mutually different frame rates are set in all the large groups 81. In this example, a frame rate of 60 fps is set for the first large group 811, a frame rate of 50 fps is set for the second large group 812, a frame rate of 24 fps is set for the third large group 813, and a frame rate of 25 fps is set for the fourth large group 814.

When the large groups 81 have mutually different frame rates, the control unit 23 records each frame based on the fastest frame rate as a standard. That is, the image information 64 is recorded at a predetermined cycle T2 (16.7 milliseconds) corresponding to 60 fps. For instance, at time t11, which is by a predetermined period T2 later than the imaging start time t0, the image information 64 is generated based on imaging signals that are read out from the unit groups 32 belonging to the first large group 811 and stored in the image file 40. At time t11, no imaging signal is read out from the first frames in other large groups 812, 813, and 814, so that the image information 64 does not include such imaging signals. Note that in FIG. 12, a symbol "X" indicates that no imaging signal is read out from a specified unit group 32 and the image information 64 does not include such an imaging signal.

At time t12, which is by a predetermined period T2 later than time t11, not only the second (i.e., the second frame) main image capturing of the first large group 811 but also the first (i.e., the first frame) main image capturing of the second large group 812 (50 fps) has been completed. Then, the control unit 23 reads out imaging signals from the unit groups 32 belonging to the first large group 811 and imaging signals from the unit groups 32 belonging to the second large group 812 and records the read out imaging signals in the image file 40. It reads out no imaging signal from the unit groups 32 belonging to the third large group 813 and the unit groups 32 belonging to the fourth large group 814, so that it records no imaging signal in the image file 40.

As described above, when the large groups 81 have mutually different frame rates, a part of the image information 64 may sometimes be missing (invalid). The control unit 23 indicates that no imaging signal that corresponds to the specified unit group 32 is included in the image information 64 based on the mask information 62b that is recorded for each frame. Specific structure of the mask information 62b will be described hereinbelow.

Figure 13:
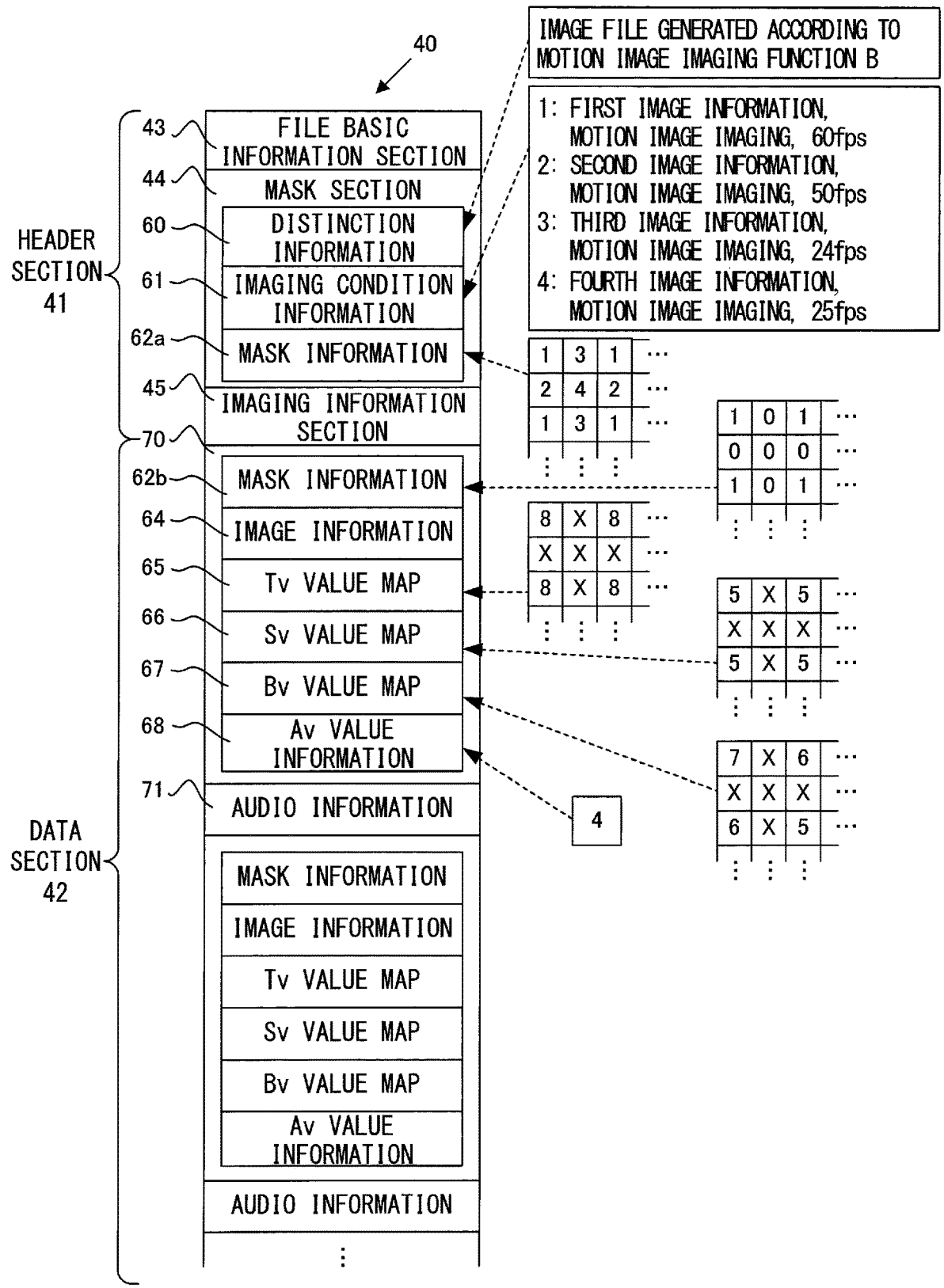
FIG. 13 is a drawing schematically showing the configuration of an image file that is generated upon performing image capturing using the motion-image image capturing function B.

FIG. 13 is a diagram schematically showing the structure of the image file 40 that is generated upon image capturing by using the motion-image image capturing function B. Hereafter, differences of the motion-image image capturing function B from the motion-image image capturing function A as shown in FIG. 7 and the still-image image capturing function B as shown in FIG. 10 are described in detail.

The distinction information 60 indicates that the image file 40 is generated by using the motion-image image capturing function B. The imaging condition information 61 is information as to which uses the unit groups 32 have. The imaging condition information 61 in the motion-image image capturing function B corresponds to information obtained by adding frame rate to the imaging condition information 61 in the still-image image capturing function B. That is, the imaging condition information 61 is to information that indicates that upon generating the image file 40, the unit groups 32 have, for instance, four kinds of uses, i.e., a use of "configuring the first image information 641 which is a motion-image at 60 fps", a use of "configuring the second image information 642, which is a motion-image at 50 fps", a use of "configuring the third image information 643, which is a motion-image at 24 fps", and a use of "configuring the fourth image information 644, which is a motion-image at 25 fps" and that represents unique numbers allotted to these uses. For instance, the numbers 1 to 4 are allotted to the uses of "configuring the first to the fourth pieces of image information 641 to 644", respectively.

The mask information 62a in the motion-image image capturing function B is information that represents respective uses of the unit groups 32 in the same manner as that in the still-image image capturing function B. That is, the mask information 62a is "information expressed in the form of a two-dimensional map generated by plotting numbers allotted to the imaging condition information 61 in accordance with the positions of the respective unit groups 32". For instance, when the number "1" is present at the coordinate (3, 5) of the mask information 62a, it is determined that the unit group 32 at the coordinate (3, 5) belongs to the first large group 811, that is, it constitutes the first image information 641.

The configuration of the data section 42 is the same as the motion-image image capturing function A. That is, in the data section 42, the block 70 of one frame quota is stored for each frame. One block 70 includes mask information 62b, image information 64, a Tv value map 65, a Sv value map 66, a Bv value map 67, and Av value information 68. Furthermore, in the data section 42, audio information 71 together with the block 70 for each frame is stored.

It is sometimes the case that in the mask information 62b, not only the number identified based on the imaging condition information 61 described above (for instance, 1 to 4) but also the number "0" may be stored. The number "0"

indicates that the unit group 32 is not used in imaging in the corresponding frame (i.e., upon imaging no imaging signal is read out). As described above, it is sometimes the case that when imaging a plurality of motion-images having frame rates differing from each other, no imaging signal that corresponds to a specific unit group 32 is stored in the image information 64 of some frame. In such a case, the control unit 23 sets the numerical value of the mask information 62 that corresponds to the specific unit group 32 to "0". Here, in the unit group 32 the numerical value of the mask information 62b is set to "0", no valid values are recorded for information other than the image information 64, i.e., the Tv value in the Tv value map 65, the Sv value in the Sv value map 66, and the Sv value in the Bv value map 67.

Note that in the unit group 32 for which the numerical value of the mask information 62b is set to "0", a configuration may be adopted in which the imaging signal in a preceding frame of the unit group 32 is recorded in the image information 64. Also, the values of a preceding frame may be recorded regarding the Tv value in the Tv value map 65, the Sv value in the Sv value map 66, and the Sv value in the Bv value map 67.

As described above, the control unit 23 records in the memory card 25 the image file 40 in which the image information 64 generated by the image sensor 22 for which imaging conditions can be set for each of the unit groups 32 is correlated with data regarding the imaging conditions for each of the unit groups 32 (the imaging condition information 61, the mask information 62, the Tv value map 65, the Sv value map 66, and the Bv value map 67, etc.) by performing image capturing by using the motion-image image capturing function B.

(5) Mixed Image Capturing Function (Motion-Image and Still-Image)

Mixed image capturing function is a function obtained by combining the still-image image capturing function B and the motion-image image capturing function B, which allows simultaneous image capturing of a still-image and a motion-image relating to the same subject under mutually different imaging conditions by a single imaging operation.

In the mixed image capturing function, the control unit 23 further classifies a plurality of unit groups 32 that is arranged in a two-dimensional array into a plurality of large groups 81 in a manner similar to those of the still-image image capturing function B and the motion-image image capturing function B. The control unit 23 performs motion-image image capturing for some of the large groups 81 in the same manner as that of the motion-image image capturing function B. The control unit 23 performs still-image image capturing in the same manner as that of the still-image image capturing function B during its motion-image image capturing by using the other large groups 81. This still-image image capturing may be performed, for instance, at a constant cycle repeatedly (automatic image capturing) or may be performed in response to a specified actuation by the user (manual image capturing).

Figure 14:
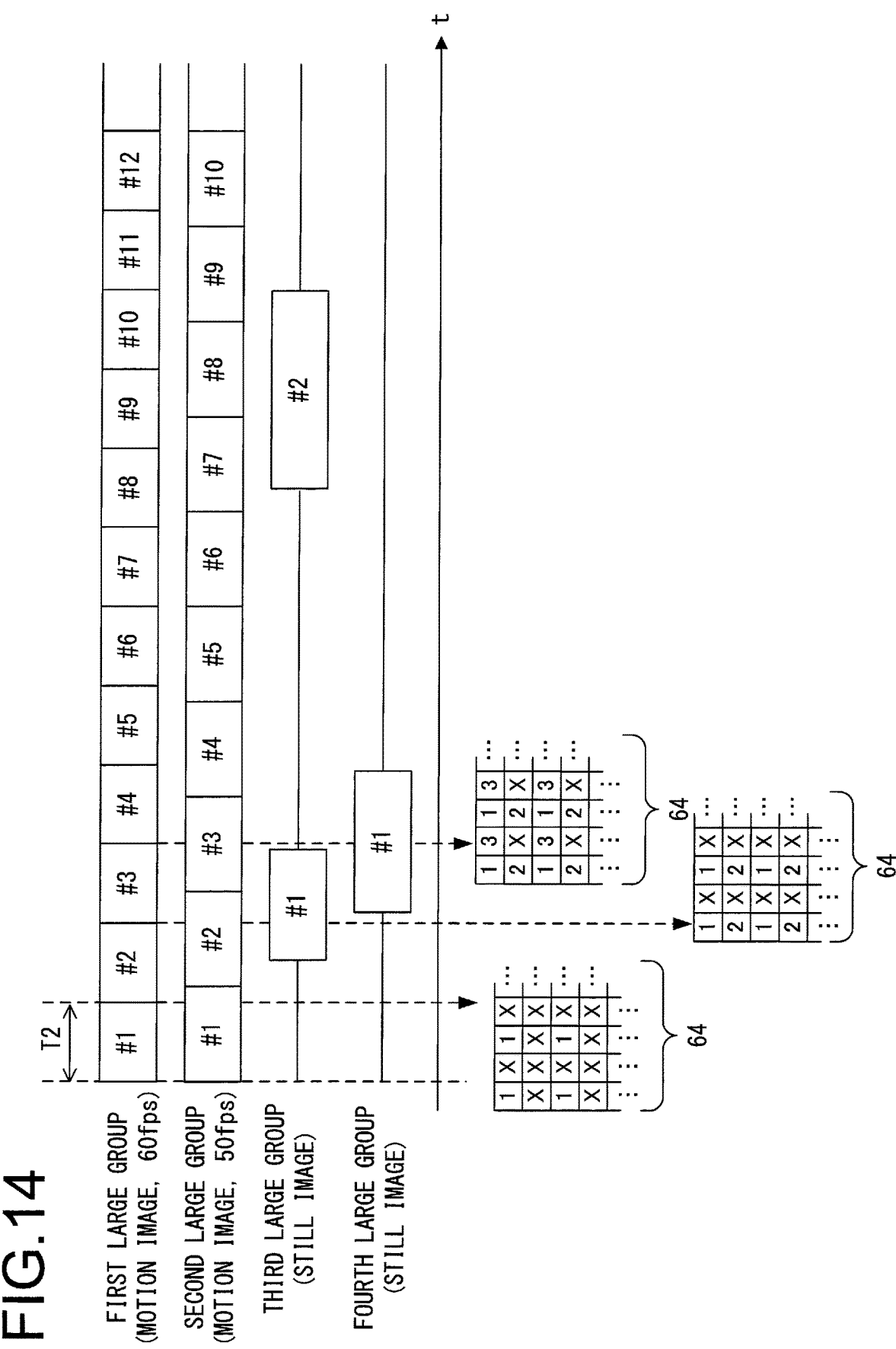
FIG. 14 is an illustrative diagram for explaining a mixed image capturing function.

FIG. 14 is an illustrative diagram for illustrating the mixed image capturing function. Here, four large groups 811 to 814 are assumed to be present. Among them, 60 fps motion-image image capturing is performed for the first large group 811, 50 fps motion-image image capturing is performed for the second large group 812, and still-image image capturing is performed in the third and fourth large groups 813, 814.

The control unit 23 records each frame based on the fastest frame rate (for instance, 60 fps) as a standard similarly to the motion-image image capturing function B. While the still-image image capturing is not performed, always no imaging signal is read out from the unit groups 32 belonging to the third and fourth large groups 813, 814. That is, the image information 64 that is recorded frame by frame does not contain imaging signals of the unit groups 32 belonging to the third and fourth large groups 813, 814 that correspond to still-images. When the control unit 23 performs still-image image capturing, it causes, at timing at which still-image image capturing is completed (i.e., at timing at which imaging signals are read out from the unit groups 32 that belong to the third and fourth large groups 813, 814), the image information 64 that corresponds to a frame immediately after the completion of the still-image image capturing to contain the imaging signals that have been read out as a result of that still-image image capturing.

Figure 15:
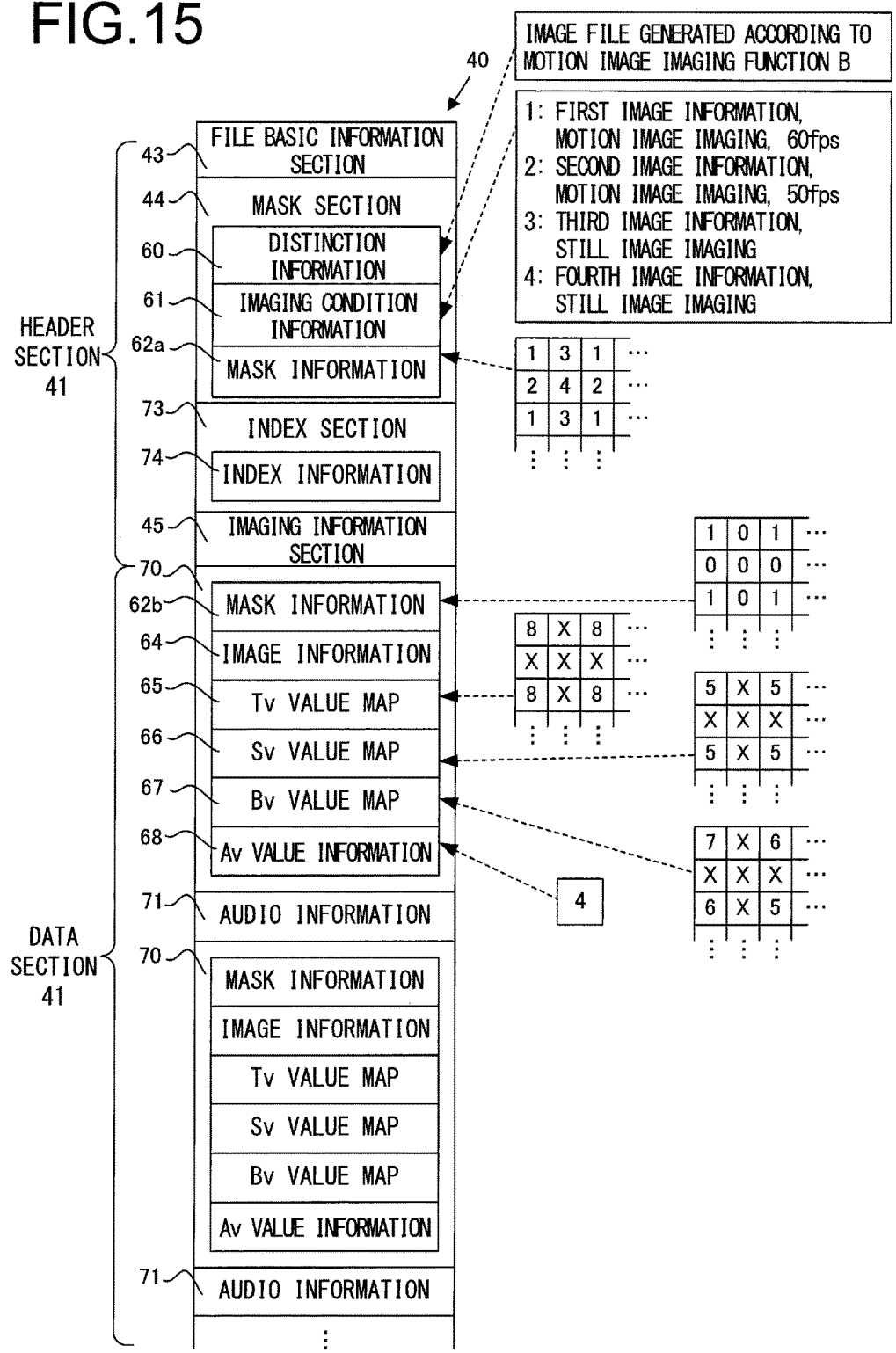
FIG. 15 is a drawing schematically showing the configuration of an image file that is generated upon performing image capturing using the mixed image capturing function.

FIG. 15 is a diagram schematically showing the structure of the image file 40 that is generated when imaging is performed by using a mixed image capturing function. Hereafter, differences of the mixed image capturing function from the motion-image image capturing function B as shown in FIG. 13 are described in detail.

The distinction information 60 indicates that the image file 40 is generated by using the mixed image capturing function. The imaging condition information 61 is information that indicates what uses the unit groups 32 have. In the case of the mixed image capturing function, the imaging condition information 61 is information that indicates that, for instance, upon generating the image file 40, the unit groups 32 have four kinds of uses, i.e., a use of "configuring first image information 641, which is a motion-image of 60 fps", a use of "configuring second image information 642, which is a motion-image of 30 fps", a use of "configuring third image information 643, which is a still-image", and a use of "configuring fourth image information 644, which is a still-image" and that represents unique numbers allotted to these uses, respectively. For instance, numbers 1 to 4 are allotted to the uses of "configuring the first to fourth pieces of image information 641 to 644".

The mask information 62a in the case of the mixed image capturing function is information that indicates respective uses of the unit groups 32 similarly to the case of the motion-image image capturing function B. That is, the mask information 62a is "information expressed in the form of a two-dimensional map obtained by plotting the numbers allotted to the imaging condition information 61 in accordance with the positions of the unit groups 32". For instance, when the number of "1" is present at the coordinate (3, 5) of the mask information 62a, the unit group 32 at the coordinate (3, 5) belongs to the first large group 811, that is, constitutes the first image information 641.

In the case of the mixed image capturing function, the header section 41 additionally contains an index section 73. In the index section 73 is recorded index information 74 that indicates which block 70 among a plurality of blocks 70 (corresponding to a plurality of frames, respectively) has stored therein a still-image. The index information 74 includes, for instance, one or a plurality of pieces of information (corresponding to the number of times of still-image image capturing) such as information "third image information 643 contained in the fifth frame image information 64 includes a still-image". The index section 73 is provided so that a still-image can be quickly searched from a plurality of blocks 70.

Note that the index information 74 may be information other than that identifies the recording position of the still-image based on the number of frames. For instance, the recording position of the still-image can be identified based on the reproduction time of the motion-image. In this case, the index information 74 is, for instance, information indicating that "the third image information 643 in the image information 64 at time of 3 minutes 15 seconds contains a still-image".

The control unit 23 adds the frame number or the time of still-image image capturing to the index section 73 as the index information 74 each time the still-image image capturing is performed while image capturing is being performed by using the mixed image capturing function. Note that the control unit 23 may be configured to store the index section 73 in the DRAM 27 temporarily and transfer the information in the DRAM 27 to the index section 73 of the image file 40 in the memory card 25 when the mixed image capturing function is terminated instead of directly adding the index information 74 to the index section 73 of the image file 40 within the memory card 25.

The configuration of the data section 42 is the same as that in the case of the motion-image image capturing function B. That is, in the data section 42, a block 70 for one frame quota is stored for each frame in the order of image capturing. A single block 70 is constituted by the mask information 62, the image information 64, the Sv value map 66, the Tv value map 65, the Bv value map 67, and the Av value information 68. In the data section 42, the audio information 71 together with the block 70 for each frame is stored.

As described above, the control unit 23 performs image capturing by using the mixed image capturing function to record in the memory card 25 the image file 40 in which the image information 64 that is generated by the image sensor 22 for which imaging conditions can be set separately for each of the unit groups 32 is correlated with data (the imaging condition information 61, the mask information 62, the Tv value map 65, the Sv value map 66, and the Bv value map 67, etc.) relating to the imaging conditions for each of the unit groups 32.

Then, a reproduction process of an image by the control unit 23 will be explained below. The reproduction process of an image is a process for generating an image of a subject from the image files 40 that are recorded in the memory card 25 by using the above-described various types of image capturing functions. The control unit 23 may for instance, display the generated image on the liquid crystal monitor 24 or may record the generated image in the memory card 25 as a file separate from the image file 40.

The control unit 23 opens the image file 40 (FIG. 5, FIG. 7, FIG. 10, FIG. 13, and FIG. 15) and reads out at first the file basic information section 43. This enables the offset and size of the mask section 44, the data section 42, etc. of the image file 40 to be found. Then, the control unit 23 reads out the distinction information 60 from the mask section 44 of the image file 40. As a result, the control unit 23 can recognize which image capturing function is used for generating the image file 40. Subsequent processing may differ for different image capturing functions. Accordingly, reproduction process of an image is explained for each of the above-mentioned image capturing functions.

(1) Still-Image Image Capturing Function A (Single Still-Image)

When the control unit 23 recognizes that the image file 40 is a file that is generated by using the still-image image capturing function A as shown in FIG. 5, it reads out the imaging condition information 61 and the mask information 62a from the mask section 44. As a result, the control unit 23 can recognize which range (which unit groups 32) among the whole image capture screen is a main subject part or a background part and change the construction of the image based on the main subject part and the background part. For instance, the main subject part is subjected to an edge enhancement process to make the image sharper and the background part is subjected to an airbrushing or blurring process to enhance the main subject part.

Then, the control unit 23 reads out the image information 64, the Tv value map 65, the Sv value map 66, the Bv value map 67, and the Av value information 68 from the data section 42. Then, the control unit 23 executes a so-called development process on the image information 64 based on the Tv value map 65, the Sv value map 66, the Bv value map 67, and the Av value information 68 that are thus read out. When the image information 64 is RAW data, the image processing section 23 executes, for instance, a well-known demosaicing process on the image information 64 having no color information to generate an image having color information. Also, the control unit 23 performs image processing such as adjustment of color, brightness, etc., noise reduction, etc. based on the Sv value map 66, etc. For instance, unit groups 32 having larger Sv values (higher sensitivities) tend to have more noises than other unit groups 32. Accordingly, the control unit 23 reduces noises more intensely when Sv values are larger. The control unit 23 can, for instance, display the image thus generated on the liquid crystal monitor 24 or record it in the memory card 25.

As described above, for reproducing the image file 40 generated by using the still-image image capturing function A, the control unit 23 reads out the imaging condition information 61 and the mask information 62a recorded in the mask section 44 prior to reading out the information recorded in the data section 42, such as image information 64, etc. This can minimize the seek time that will be generated upon reproduction process since the mask section 44 is recorded before the data section 42.

Note that as described above, in the data section 42 is stored the mask information 62b that is the same as the mask information 62a stored in the header section 41. Accordingly, the control unit 23 may be configured to read out the mask information 62b instead of the mask information 62a from the data section 42.

(2) Motion-Image Image Capturing Function A (Single Motion-Image)

When the control unit 23 recognizes that the image file 40 is a file generated by using the motion-image image capturing function A as shown in FIG. 7, it reads out the mask information 62a from the mask section 44. The control unit 23 determines which range (which unit groups 32) among the whole image capture screen is a main subject part or a background part. Then, the control unit 23 reads out the imaging condition information 61 from the mask section 44. As a result, the control unit 23 can recognize frame rates of the main subject part and background part. Then, the control unit 23 reads out the image information 64, the data section 42, the Tv value map 65, the Sv value map 66, the Bv value map 67, and the Av value information 68 from a head or first block 70 of the data section 42 and subsequent blocks 70 in order and generates each frame that constitutes a motion-image based thereon.

Upon generating each of the frames, the control unit 23 reads out from the block 70 at first the mask information 62b. Then, it determines which range (which unit groups 32) in the frame is a main subject part or a background part. Thereafter, the control unit 23 executes different image processes on the main subject part and on the background part as explained with respect to the still-image image capturing function A. The control unit 23, for instance, displays the motion-image constituted by the frames that are generated as described above on the liquid crystal monitor 24 or records it in the memory card 25.

As described above, for reproducing the image file 40 that is generated by using the motion-image image capturing function A, the control unit 23 reads out the mask information 62b prior to the information recorded in the block 70, such as image information 64, etc. Since the mask information 62b is recorded before the image information 64, etc., the seek time that will occur upon reproduction process can be minimized.

Note that since the mask information 62b in the head block of the data section 42 is the same information as the mask information 62a recorded in the mask section 44, the control unit 23 may be configured so as not to read out the mask information 62a from the mask section 44.

(3) Still-Image Image Capturing Function B (a Plurality of Still-Images)

When the control unit 23 recognizes that the image file 40 is a file that is generated by using the still-image image capturing function B as shown in FIG. 10, it reads out the imaging condition information 61 and the mask information 62a from the mask section 44. This allows the control unit 23 to determine how many kinds of still-images are captured simultaneously and which unit groups 32 constitutes any one of still-images. That is, it determines how many large groups 81 are present and to which large group each of the unit groups 32 belongs.

Then, the control unit 23 reads out the image information 64, the Tv value map 65, the Sv value map 66, the Bv value map 67, and the Av value information 68 from the data section 42. Then, the control unit 23 executes a so-called development process on the image information 64 for each large group 81 separately based on the Tv value map 65, the Sv value map 66, the Bv value map 67, and the Av value information 68 to generate a still-image. As a result, a plurality of still-images (for instance, four still-images) is generated. The control unit 23, for instance, displays the images generated as described above on the liquid crystal monitor 24 or records them in the memory card 25.

As described above, for reproducing the image file 40 that is generated by using the still-image image capturing function B, the control unit 23 reads out the imaging condition information 61 and the mask information 62a recorded in the mask section 44 prior to the information recorded in the data section 42, such as the image information 64, etc. Since the mask section 44 is recorded before the data section 42, the seek time that will occur upon reproduction process can be minimized.

Note that as described above, the mask information 62b which is the same information as the mask information 62a stored in the header section 41 is stored in the data section 42. Accordingly, the mask information 62b may be read out from the data section 42 instead of the mask information 62a.

(4) Motion-Image Image Capturing Function B (a Plurality of Motion-Images)

When the control unit 23 recognizes that the image file 40 is a file that is generated by using the motion-image image capturing function B as shown in FIG. 13, it reads out the mask information 62a and the imaging condition information 61 from the mask section 44. This allows the control unit 23 to determine how many kinds of motion-images are captured simultaneously, which unit groups 32 constitute any one of motion-images, and the frame rate of each motion-image. That is, it determines how many large groups 81 are present, which large group 81 each of the unit groups 32 belongs to, and the frame rate at which each of the large groups 81 is imaged. Then, the control unit 23 reads out the image information 64, the Tv value map 65, the Sv value map 66, the Bv value map 67, and the Av value information 68 from the head and subsequent blocks 70 in the data section 42 in order and generates each of the frame that constitute each of the motion-images based thereon.

For generating each of the frames, the control unit 23 at first reads out the mask information 62b from the block 70. Then the control unit 23 determines which large group 81 the pixel signal contained in the image information 64 in the block 70 corresponds to. Thereafter, the control unit 23 generates a frame that corresponds to each of the large groups 81. However, it generates no frame for a large group 81 if no pixel signal corresponding to this large group 81 is contained in the image information 64 in the block 70. The control unit 23, for instance, displays the motion-image constituted by the frames that are generated as described above on the liquid crystal monitor 24 or records it in the memory card 25.

As described above, for reproducing the image file 40 that is generated by using the motion-image image capturing function B, the control unit 23 reads out the mask information 62a, 62b prior to the information recorded in the block 70, such as the image information 64, etc. Since the mask information 62a, 62b is recorded before the image information 64, etc, the seek time that will occur upon the reproduction process can be minimized.

Note that since the mask information 62b in the head block in the data section 42 is the same information as the mask information 62a recorded in the mask section 44, the control unit 23 may be configured so as not to read out mask the information 62a from the mask section 44.

(5) Mixed Image Capturing Function (Motion-Image and Still-Image)

When the control unit 23 recognizes that the image file 40 is a file that is generated by using the mixed image capturing function as shown in FIG. 15, it reads out the mask information 62a and the imaging condition information 61 from the mask section 44. This allows the control unit 23 to determine how many kinds of motion-images and how many kinds of still-images are captured simultaneously, which unit groups 32 constitutes any one of still-images and any one of motion-images, and the frame rate of each motion-image. That is, the control unit 23 determines how many large groups 81 are present, whether each of the large groups 81 is a still-image or a motion-image, the frame rate of each of the unit groups 32 if the large group 81 is a motion-image, and which large group 81 any one of the unit groups 32 belongs to. Then, the control unit 23 reads the image information 64, the Tv value map 65, the Sv value map 66, the Bv value map 67, and the Av value information 68 from the head and subsequent blocks 70 in the data section 42 in order and generates, based thereon, each of the frames that constitute each of the motion-images and each of the still-images.

For generating each of the frames of a motion-image or a still-image, the control unit 23 at first reads out the mask information 62b from the block 70. Then, it determines which large group 81 the pixel signal contained in the image information 64 in the block 70 corresponds to. Thereafter, the control unit 23 generates a frame or a still-image that corresponds to each of the large groups 81. However, it generates neither frame nor still-image for a large group 81 if no pixel signal corresponding to this large group 81 is contained in their image information 64 in the block 70. The control unit 23, for instance, displays the motion-image that is constituted by the frames or the still-image generated as described above on the liquid crystal monitor 24 or records it in the memory card 25.

As described above, for reproducing the image file 40 that is generated by using the mixed image capturing function, the control unit 23 reads out the mask information 62*a*, 62*b* prior to the information recorded in the block 70, such as the image information 64, etc. Since the mask information 62*a*, 62*b* is recorded before the image information 64, etc, the seek time that will occur upon the reproduction process can be minimized.

Note that since the mask information 62*b* in the head block in the data section 42 is the same information as the mask information 62*a* recorded in the mask section 44, the control unit 23 may be configured to read out no mask information 62*a* from the mask section 44.

The reproduction process of images is a process by which an image of a subject is generated based on the image file 40 that is recorded in the memory card 25 by one of the above-mentioned various types of image capturing functions. However, it may be a process by which a still-image and/or a motion-image is generated based on the image file 40 before it can be recorded in the memory card 25. The control unit 23 may be configured to perform a compression process after the still-image and/or motion-image is generated.

Note that a configuration may be adopted in which an electronic apparatus that is different from the image capturing device 10 (hereafter, referred to as a reproduction device) executes the above-mentioned reproduction process. For instance, a configuration may be adopted in which when the memory card 25 is removed from the image capturing device 10 and attached to a reproduction device in a personal computer (PC), the reproduction device reads out the image file 40 from the memory card 25 and executes the above-mentioned reproduction process to reproduce an image. Also, a configuration may be adopted in which data communication, such as wireless communication, is performed between the image capturing device 10 and the reproduction device to transfer the image information 64, etc.

The image capturing device according to the above-mentioned first embodiment provides the following operations and advantageous effects.

(1) The image sensor 22 has a plurality of unit groups 32 (imaging capture regions) so that imaging condition can be set for each of the unit groups 32 separately. The control unit 23 records the image information 64 (image data) generated by the image sensor 22 in correlation with the data relating to imaging conditions, such as the imaging condition information 61, the mask information 62, the Tv value map 65, the Sv value map 66, the Bv value map 67, etc. (imaging condition data) for each of the unit groups 32. This configuration makes it possible to know what imaging conditions have been applied to each of the pixels at the time of reproducing the image file 40, which is the result of the image capturing, or at some other timings. As a result, the image capturing device 10 which is user-friendly can be provided.

(2) The information relating to imaging conditions that is recorded in correlation with the image information 64 includes, for instance, information relating exposure upon capturing an image of a subject by the image sensor 22 and information relating to brightness of the subject whose image is captured by the image sensor 22. Specifically, the information relating to imaging conditions includes the Bv value map 67, which is information relating to the luminance of the subject whose image is captured by the image sensor 22, the Tv value map 65, which is accumulation time in which charges are accumulated by a photoelectric conversion unit not shown in the figures, the Sv value map 66, which is an amplification factor by an amplifying unit not shown in the figures, etc. Each of these pieces of information can be said to be information relating to the imaging operation of the image sensor 22. This configuration enables more suitable image processing to be performed upon reproduction of the image file 40.

(3) The control unit 23 is configured to record information relating to the imaging conditions, which varies upon each image capturing, in correlation with the image information 64. This configuration enables suitable information to be added to each image file 40 and more suitable image processing to be performed upon reproduction.

(4) The control unit 23 is configured to record a plurality of pieces of information relating to imaging conditions that correspond to the image information 64, respectively, in a single image file 40 in chronological order. This configuration enables, for instance, when a motion-image is recorded in the image file 40, image processing based on these pieces of information to be performed with ease.

(5) The control unit 23 is configured to record, for the image file 40 that has the header section 41 and the data section 42 in which the image information 64 is recorded (image data section), information relating to imaging conditions in at least one of the header section 41 and the data section 42. By this configuration, it is possible to know what imaging conditions have been applied to each of the pixels, for instance, upon reproduction of the image file 40.

(6) The control unit 23 is configured to record the imaging condition information 61 and the mask information 62 relating to uses for a plurality of unit groups 32, respectively, in correlation with the image information 64. With this configuration, it is possible to know what imaging conditions have been applied to each of the pixels, for instance, upon reproduction of the image file 40.

(7) The mask information 62 contains dynamic information, which varies with time. Specifically, the mask information 62 contains information indicating whether the image information 64 includes a pixel value corresponding to a pixel signal that is read out from the imaging pixel 31 belonging to the unit group 32 or information indicating which one of a plurality of mutually different groups each of a plurality of unit groups 32 has been classified into. This enables image processing using dynamic information to be performed, for instance, upon reproducing the image file 40.

(8) The mask information 62 contains static information, which does not vary with time. Specifically, the mask information 62 contains information indicating respective functions of the plurality of unit groups 32. Furthermore, the mask information 62*a* contains information indicating which one of a plurality of mutually different groups each of the plurality of unit groups 32 has originally been classified into at the beginning of image capturing. This enables image processing using static information to be performed, for instance, upon reproducing the image file 40.

(9) The control unit 23 is configured to record, in a single image file 40, a plurality of pieces of the mask information 62*b* corresponding to the plurality of pieces of image information 64 in chronological order. This configuration enables chronological tracking of imaging conditions, for instance, upon reproducing the image file 40.

(10) The control unit 23 is configured to record, for the image file 40 that has the header section 41 and the data section 42 in which the image information 64 is recorded (image data section), the mask information 62 in at least one of the header section 41 and the data section 42. By this configuration, it is possible to know what imaging conditions have been applied to each of the pixels, for instance, upon reproduction of the image file 40.

(11) The plurality of unit groups 32 includes a unit group 32 whose image is captured at a first frame rate and a unit group 32 whose image is captured at a second frame rate, which is lower than the first frame rate. The control unit 23 records a plurality of pieces of image information 64 based on the first frame rate. This enables recording the information relating to all the frames in every detail without fail.

(12) The control unit 23 is configured to record audio information 71 (audio data) corresponding to imaging periods of a plurality of pieces of image information 64 in correlation with the plurality of pieces of image information 64. This configuration enables reproduction of motion image including sound.

(13) The control unit 23 is configured to record at least one of information relating to an imaging pattern of the image information 64, information relating to a method of storing the image information 64, and information relating to imaging conditions for each unit group 32 in the image file 40 that includes two blocks, i.e., the header section 41 and the data section 42, more particularly in the header section 41. By this construction, it is possible to know what imaging conditions have been applied to each of the pixels, for instance, upon reproducing the image file 40.

Second Embodiment

An image capturing device according to a second embodiment has a configuration similar to that of the image capturing device 10 according to the first embodiment. However, the methods for recording the image file 40 according to the still-image image capturing function B, the motion-image image capturing function B, and the mixed image capturing function are different from those in the first embodiment. Hereafter, this feature is described in detail.

As described above, the still-image image capturing function B, the motion-image image capturing function B, and the mixed image capturing function are each a function by which a plurality of still-images and/or a plurality of motion-images relating to the same subject are captured simultaneously by a single image capturing operation. In this embodiment, the control unit 23 is configured so as to divide the plurality of still-images and/or the plurality of motion-images thus captured into a plurality of image files 40 and record them separately instead of recording them into a single image file 40. On this occasion, the control unit 23 records the separately recorded image files 40 in correlation with each other. As a result, although the divided files are recorded separately for convenience's sake, the information indicating that the plurality of image files 40 have been acquired by a single imaging operation is not impaired, similarly to the first embodiment. In other words, the plurality of image files 40 can be handled later under recognition that they have been acquired by a single image capturing operation similarly to the case in the first embodiment.

Figure 16:
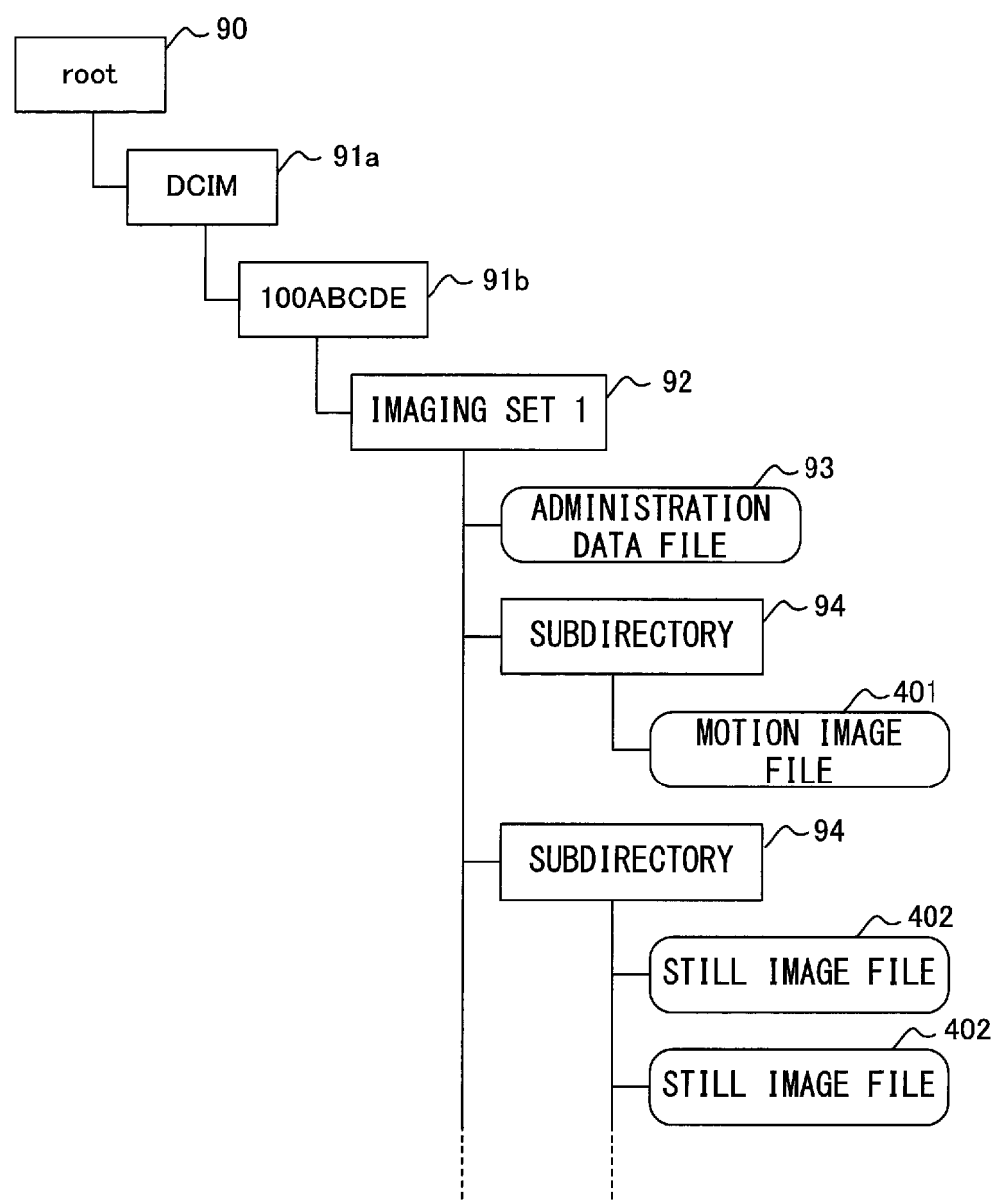
FIG. 16 is a diagram schematically showing the directory structure of a memory card according to a second embodiment.

FIG. 16 is a diagram schematically showing a directory structure of the memory card 25. A root directory 90 of the memory card 25 has a DCIM directory 91a. The DCIM directory 91a has therein a subdirectory 91b for storing images. For each single image capturing operation by using the still-image image capturing function B, the motion-image image capturing function B, or the mixed image capturing function, the control unit 23 generates a single imaging set directory 92 in this subdirectory 91b. That is, one imaging set directory 92 corresponds to one image capturing operation.

In the imaging set directory 92, one administration data file 93 and subdirectories 94 for respective uses of the unit group 32 are generated. For instance, if a unit groups 32 have four uses, four subdirectories 94 are generated. For each of the subdirectories 94, at least one image file 40 corresponding to a use of the unit group 32 is generated. For instance, if the use of the unit group 32 is the motion-image image capturing, only one motion-image file 401 is recorded in the subdirectory 94 corresponding to this use. On the other hand, if the use of the unit group 32 is the still-image image capturing, a still-image file 402 is recorded in the subdirectory 94 a number of times that corresponds to the number of times of image capturing operation. Note that in the case of the still-image image capturing function B, only one still-image file 402 is recorded for each of the uses by a single image capturing operation, so that one still-image file 402 is recorded in each subdirectory 94.

FIG. 17(a) is a diagram schematically showing the structure of the administration data file 93. The administration data file 93 is a file in which information that correlates the image files 40 recorded in the subdirectories 94 with each other and includes a file basic information section 43, a mask section 44, an index section 73, and an imaging information section 45. The file basic information section 43, the mask section 44, and the imaging information section 45 are the same as those sections having the same names in the image file 40 that are explained in FIG. 15, etc. In the index section 73, layout information 96 that indicates which use of the unit group 32 each of the subdirectories 94 corresponds to, is recorded.

FIG. 17(b) is a diagram schematically showing the structure of the still-image file 402 that is recorded in the subdirectory 94. In the still-image file 402 are recorded mask information 62b, image information 64, a Tv value map 65, a Sv value map 66, a Bv value map 67, and Av value information 68. Since the Av value information 68 is similar to that explained in FIG. 10 and explanation thereof is omitted.

The mask information 62b, the image information 64, the Tv value map 65, the Sv value map 66, and the Bv value map 67 are each information that is obtained by extracting only values corresponding to one of the large groups 81 from the information having the same name as explained in FIG. 10 and arranging the extracted values in a two-dimensional array. For instance, in the image file 40 that is explained in FIG. 10, the mask information 62b is "information that contains numbers allotted to imaging condition information 61 expressed in the form of a two-dimensional map in accordance with the positions of the unit groups 32". The number of values contained in the mask information 62b is the same as the number of the unit groups 32. In contrast, the mask information 62b in the still-image file 402 is information that is prepared by extracting from all the values only those values that correspond to the large group 81, which in turn corresponds to this subdirectory 94, and expressing the extracted values in the form of a two-dimensional map. The image information 64, the Tv value map 65, the Sv value map 66, and the Bv value map 67 are similarly prepared and one still-image file 402 contains only those values corresponding to one large group 81.

Figure 18:
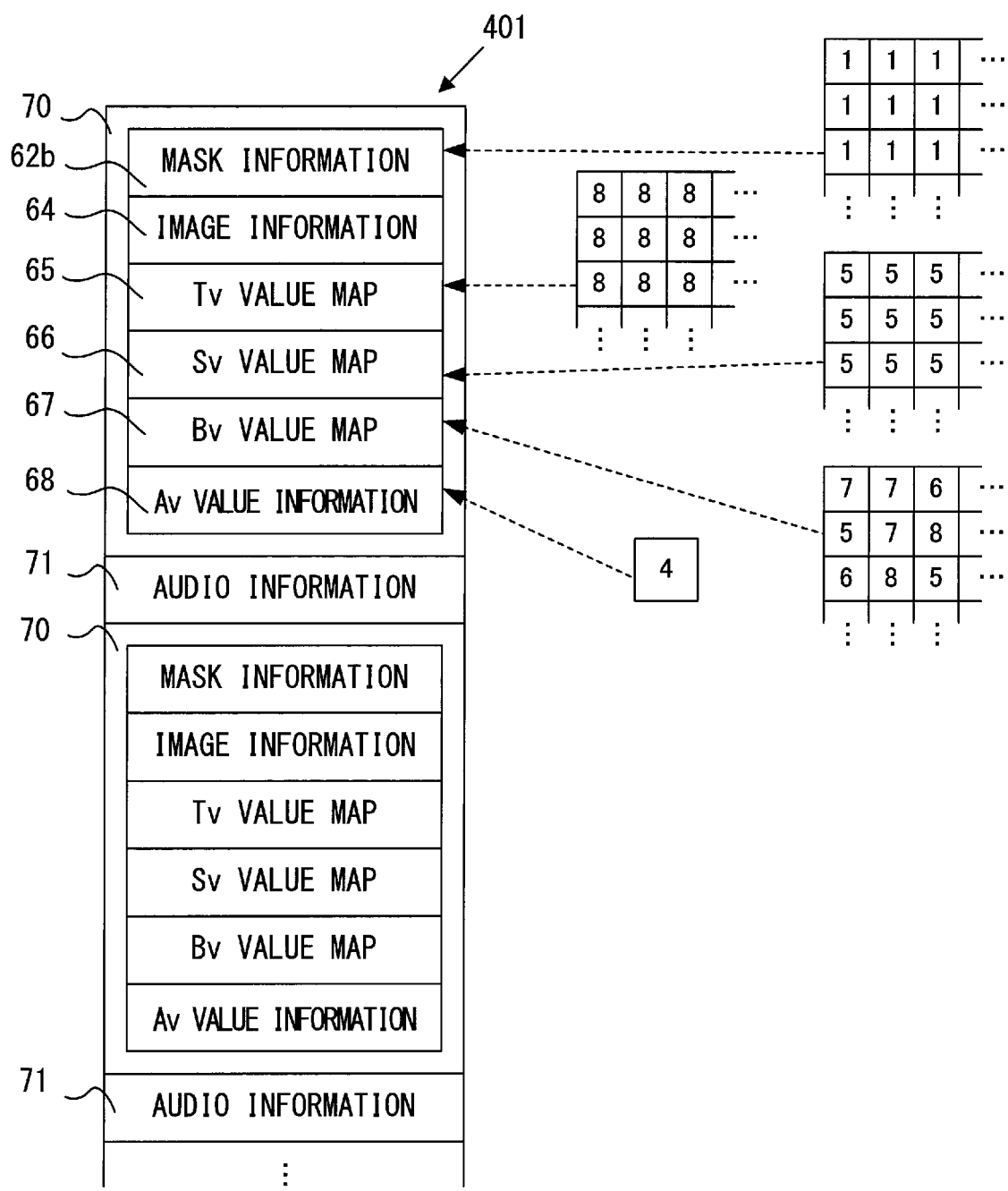
FIG. 18 is a diagram schematically showing the structure of each file according to the second embodiment.

FIG. 18 is a diagram schematically showing the structure of the motion-image file 401 that is recorded in the subdirectory 94. In the motion-image file 401 is stored one frame quota block 70 for each of the frames in order of image capturing. A single block 70 includes mask information 62b, image information 64, a Tv value map 65, a Sv value map 66, a Bv value map 67, and Av value information 68. The motion-image file 401 has stored therein the block 70 for each frame together with audio information 71. Since the Av value information 68 is similar to that explained in FIG. 13 and explanation thereof is omitted.

The mask information 62b, the image information 64, the Tv value map 65, the Sv value map 66, and the Bv value map 67 are each information that is obtained by extracting only values corresponding to one large group 81 from the information having the same name as explained in FIG. 13 and arranging the extracted values in a two-dimensional array. This is the same as in the case of the above-mentioned still image file 402 and explanation thereof is omitted.

As described above, the control unit 23 records, in the memory card 25, the image information 64 that is generated by the image sensor 22 for which imaging conditions can be set for each of the unit groups 32 separately in correlation with data relating to the imaging conditions (the imaging condition information 61, the mask information 62, the Tv value map 65, the Sv value map 66, the Bv value map 67, etc.) for each of the unit groups 32. Differently from the first embodiment, in this embodiment, the administration data file 93, the motion image file 401, and the still image file 402 are correlated with each other via the layout information 96 in the administration data file 93 although they do not form a single image file 40.

The image capturing device according to the second embodiment provides the similar operation and advantageous effects as those of the image capturing device according to the first embodiment.

Variations as described below are also included within the scope of the present invention and one or more variation examples may be combined with the above-mentioned embodiments.

Variation Example 1

In the first embodiment, the first image information 641 and the second image information 642 have been explained that they are generated when reproducing the image file 40. However, they may be recorded in the image file 40 in advance. In other words, the motion-image and the still-image, which are recorded in different subdirectories 94 as different files for each of the large groups 81 separately in the second embodiment, may be recorded in a single image file 40. In this case, data for one frame quota that is recorded in the image file 40 corresponds to one large group 81.

For instance, a case may be conceived in which two motion-images (first motion-image and second motion-image) that are recorded in two files, separately, according to the second embodiment are recorded in a single image file 40. In this case, starting from the head of the data section 42, data relating to the first frame, second frame, third frame, . . . , respectively, of the first motion-image are recorded in chronological order, and subsequently data relating to the first frame, second frame, third frame, . . . , respectively, of the second motion-image are recorded in chronological order. In this manner, the load of the reproduction process can be reduced.

As a recording method other than is described above, a recording method may be adopted in which data relating to each frame of the first motion-image and data relating to each frame of the second motion-image are recorded in chronological order with respect to each of the frames. That is, each of the frames of each of two motion-images may be recorded in the form of an array in chronological order of image capturing, such as an array of "the first frame of the first motion-image, the first frame of the second motion-image, the second frame of the first motion-image . . . ". This enables the recording process to be performed at a reduced load.

Variation Example 2

In the explanation of the first embodiment, it has been stated that in the data section 42 of the image file 40 generated by using the motion-image image capturing function B and the mixed image capturing function are recorded the image information 64 and various types of map information according to the array of the unit groups 32 in the image sensor 22. Recording may be performed based on an array different from the array of the unit groups 32. Hereafter, this is described in detail.

Figure 19:
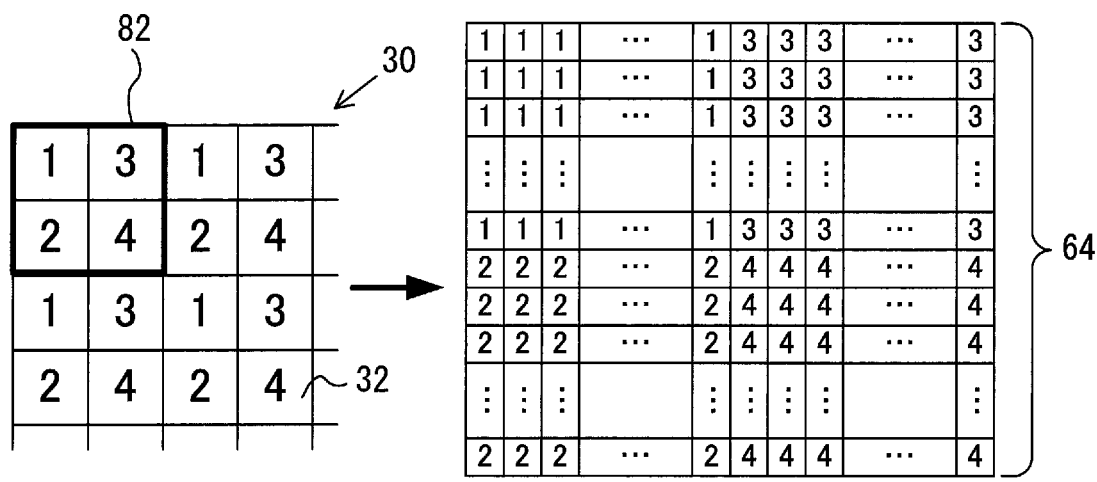
FIG. 19 is an illustrative diagram for explaining Variation Example 2.

FIG. 19 is an illustrative diagram for illustrating Variation Example 2. Here, the unit groups 32 are classified into four large groups 81 in the same manner as in FIG. 8(b). However, the image information 64 that will be generated by the control unit 23 afterward is not formed by arranging imaging signals according to the array of the unit groups 32. Specifically, the image information 64 is generated by aggregating imaging signals for each large group 81 and then interlinks them. For instance, when the image information 64 is separated into four regions in a 2×2 construction, imaging signals from the unit groups 32 belonging to the first large group 81 are aggregated in the upper left region. In the lower left region, imaging signals from the unit groups 32 belonging to the second large group 81 are aggregated. Further, in the upper right region, imaging signals from the unit groups 32 belonging to the third large group 81 are aggregated. In the lower right region, imaging signals from the unit groups 32 belonging to the fourth large group 81 are aggregated.

Note that when changing the array of imaging signals in the image information 64 as described above, it is necessary to change the arrays of the Tv value map 65, the Sv value map 66, the mask information 62, etc. in accordance with that array.

The array of the image information 64 may be changed by a method other than this. That is, as long as the array in the image information 64 and the array in other information relating to other imaging conditions (mask information 62, etc.) correspond to each other in the image file 40, any types of arrays may be employed.

Variation Example 3

Figure 20:
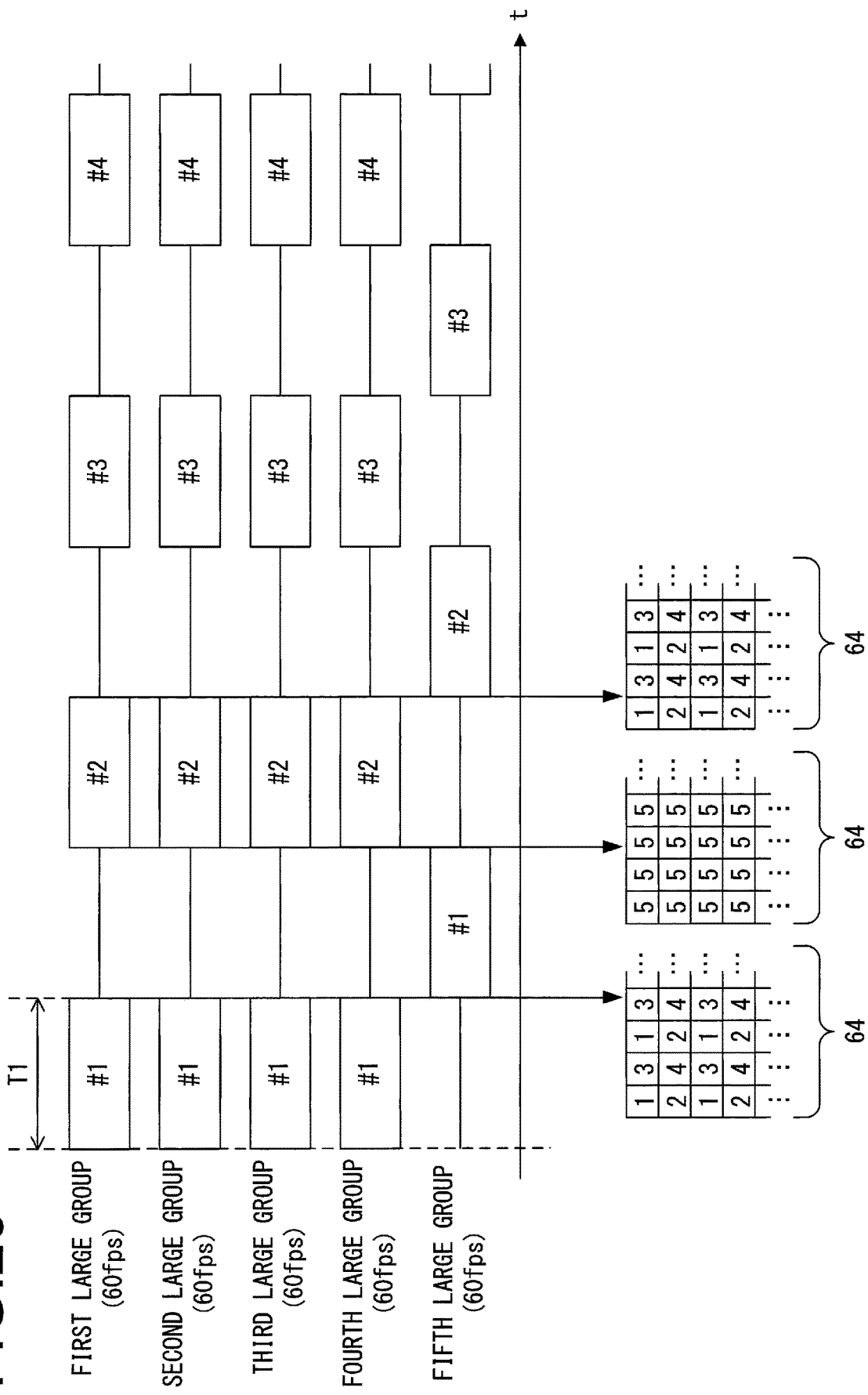
FIG. 20 is an illustrative diagram for explaining Variation Example 3.

In the case of the motion-image image capturing function B and the mixed image capturing function, the use of the unit group 32 may be changed frame by frame. For instance, it is configured such that as shown in FIG. 20, the unit groups 32 are classified into the first to fourth large groups 81 for odd number frames so that the image information 64 containing four pieces of the image information 641, 642, 643, 644 with different imaging conditions can be obtained. For even number frames, the unit groups 32 are classified into the fifth large group 81 only so that only the single image information 64 can be obtained. That is, a configuration may be adopted in which a plurality of images having different imaging conditions with a relatively small number of pixels and a single image with a relatively large number of pixels are captured in a time shared fashion. Variation Example 3 may be applied to Variation Example 1 or to Variation Example 2 described above.

Variation Example 4

Figure 21:
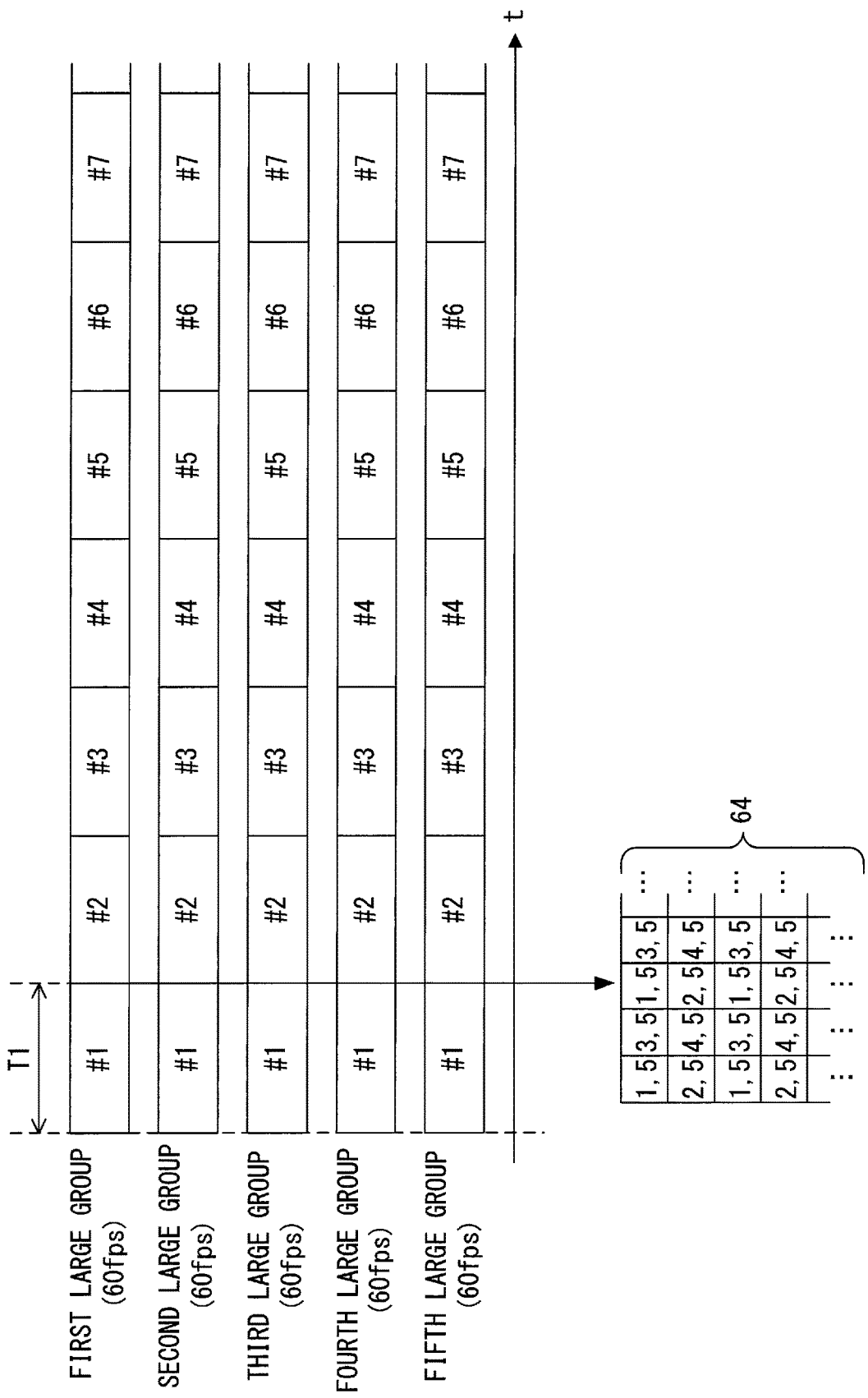
FIG. 21 is an illustrative diagram for explaining Variation Example 4.

In the case of the motion-image image capturing function B and the mixed image capturing function, a configuration may be adopted in which a single unit group 32 has a plurality of uses. For instance, a configuration may be adopted in which as shown in FIG. 21, the unit groups 32 are classified into the first to fourth large groups 81, respectively and also all the unit groups 32 are classified into the fifth large group 81. In this case, when reproduction (development, etc.) of the image file 40 is performed according to the former classification, the image information 64 that contain the four pieces of the image information 641, 642, 643, 644 can be obtained. On the other hand, when reproduction (development, etc.) of the image file 40 is performed according to the latter classification, the single image information 64 with a larger number of pixels can be obtained.

Variation Example 5

In the explanation of the still-image image capturing function B, it has been stated that the unit group 32, for which the number "0" is allotted on the mask information 62, is not used in imaging and the image information 64 recorded in the data section 42 contains no information relating to that unit group 32. Also in the case of the still-image image capturing function A and the motion-image image capturing function A, a configuration may be adopted in which the number "0" has the same meaning as that in the case of the still-image image capturing function B.

Also, a configuration may be adopted in which the number "0" in the mask information 62 in the header section 41 indicates that the unit group 32, for which the number "0" is allotted, is not used in image capturing. For instance, when, in the case of the still-image image capturing function B and the motion-image image capturing function B, the whole image capture screen is separated into sets of four unit groups 32 in a 2×2 configuration, different uses are allotted to different unit groups 32, respectively, and if the number of the unit groups 32 in the vertical direction (row number) is odd, one row is left as the balance. In such a case, a configuration may be adopted in which the one row left as the balance is not used in imaging and the number of "0" is allotted to the one row in the mask information 62 that is recorded in the header section 41.

Note that the number of "0" is only an example and other numbers may be used similarly to the above-mentioned number "0".

Variation Example 6

The structure of the image file 40 may be different from those of the above-mentioned embodiments. The information relating to the imaging conditions that is recorded in the image file 40 may be different from the information that is explained in the first embodiment, etc. For instance, recording of some information such as the Sv value map 66 or the like may be omitted. On the contrary, information other than the above-mentioned one may further be added. Furthermore, the mode of recording may be different from those in the above-mentioned embodiments. For instance, the Av value information 68 may be recorded as an Av value map generated by arranging Av values in a two-dimensional array for each of the unit groups 32 in the same manner as that in Tv values, Sv values, etc.

Variation Example 7

In each of the above-mentioned embodiments, the image capturing device, which is a single electronic apparatus that includes the image sensor 22 and the control unit 23, has been explained. However, the present invention is not limited to these embodiments. For instance, the present invention may be applied to an electronic apparatus that controls the image sensor 22 provided as an external device. Hereafter, a mode, in which an image capturing unit 1001 provided with the image sensor 22 is controlled through an external apparatus, is explained in detail.

Figure 22:
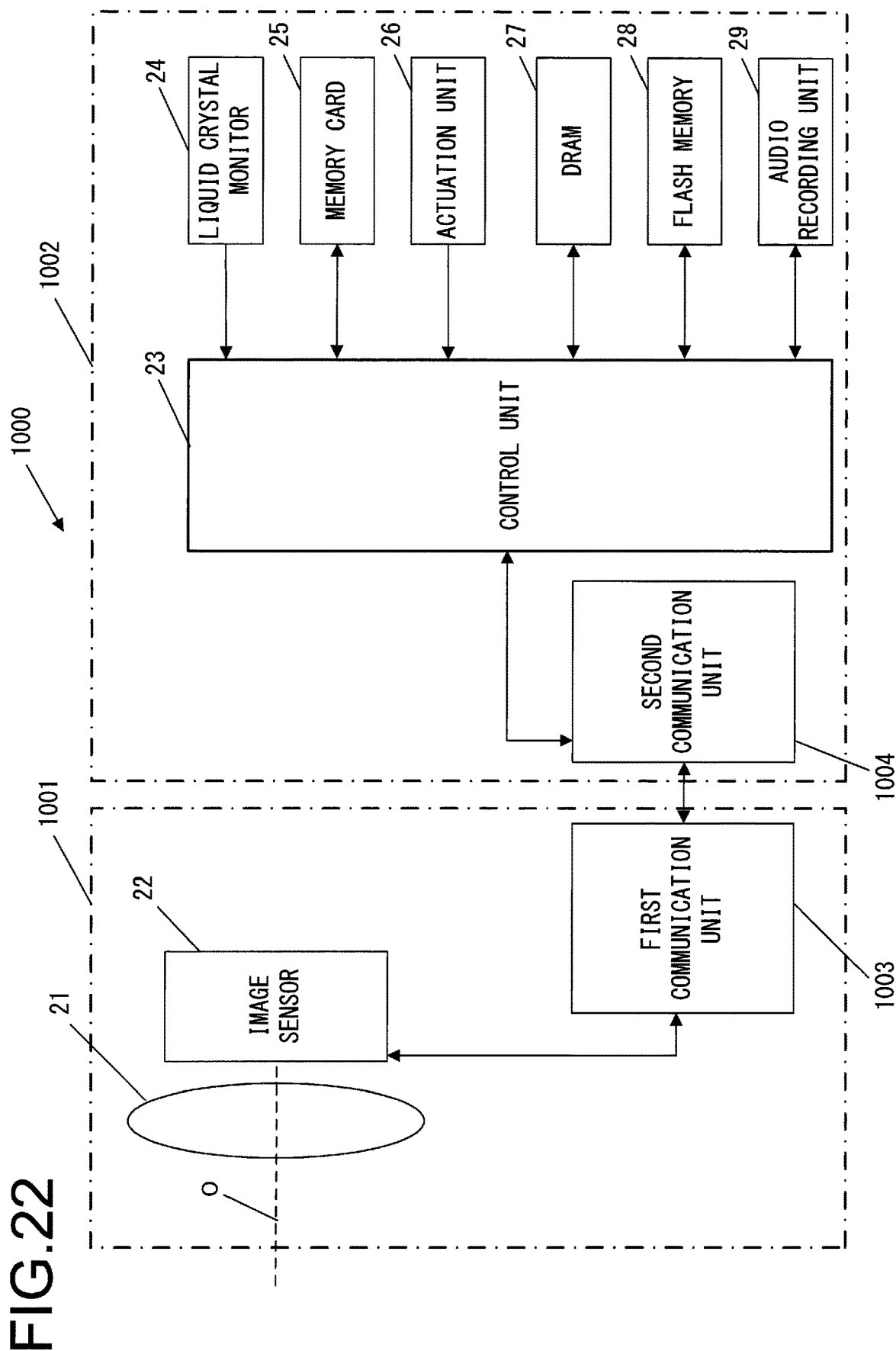
FIG. 22 is an illustrative diagram for explaining Variation Example 7.

FIG. 22 is a block diagram schematically showing a configuration of an image capturing system according to Variation Example 7. The image capturing system 1000 shown in FIG. 22 includes the image capturing unit 1001 and an electronic apparatus 1002. The image capturing unit 1001 includes the image capturing optical system 21 and the image sensor 22 that are explained in the first embodiment and further a first communication unit 1003. The electronic apparatus 1002 includes the control unit 23, the liquid crystal monitor 24, the memory card 25, the actuation unit 26, the DRAM 27, the flash memory 28, and the recording unit 29 that have been explained in the first embodiment and further a second communication unit 1004. The first communication unit 1003 and the second communication unit 1004 are capable of performing bidirectional data communication by using, for instance, a well-known wireless communication technology and an optical communication technology, etc. Also, a configuration may be adopted in which the image capturing unit 1001 and the electronic apparatus 1002 perform bidirectional data communication via wire-line connection such as cable, etc. to enable bidirectional data communication between the first communication unit 1003 and the second communication unit 1004.

In the image capturing system 1000 according to Variation Example 7, the control unit 23 controls the image sensor 22 by data communication through the second communication unit 1004 and the first communication unit 1003. For instance, by transmitting and receiving predetermined control data to and from the image capturing unit 1001, the control unit 23 sets imaging conditions that differ for each of the unit groups 32 or reads out an imaging signal from each of the unit groups 32.

As described above, in the image capturing system 1000, control on each of the unit groups 32 is performed by the control unit 23. The electronic apparatus 1002 is provided with no image sensor 22. However, by controlling the image sensor 22 (image capturing unit 1001) that is provided outside of the electronic apparatus 1002, the same control as that in the first embodiment can be obtained. That is, the present invention can be applied to an electronic apparatus that has no image sensor 22.

Variation Example 8

To reduce the data amount of the image information 64, the image information 64 may be compressed by a well-known reversible compression technology before it is recorded. The image information 64 may be recorded in the form of difference values with respect to adjacent pixels. For instance, a configuration may be adopted in which at a position, at which the pixel value (imaging signal) of a specified pixel is recorded, is recorded a difference value between the specified pixel and its left adjacent pixel. Alternatively, a difference value from an average pixel value of all the pixels in a predetermined region may be recorded or a difference value from an average pixel value of all the pixels may be recorded.

In the case of motion-images, a configuration in which a difference value from the pixel value at the same position as that of a previous frame is recorded enables a further reduction of data amount. Alternatively, a configuration may be adopted in which a pixel value is recorded only when the pixel value differs from a pixel value of the previous frame at the same position and no pixel value is recorded when the pixel value is the same as that of the previous frame. This configuration may be applied to the imaging conditions (Sv value, Tv value, etc.). For instance, a configuration may be adopted in which when one frame has the same Sv value as that of a previous frame for a unit group 32, that Sv value is not recorded.

Note that if the image information 64 is recorded in the form that is described as above, it is necessary to perform a process for restoring original pixel values from these forms for reproduction (i.e., at the time of development).

Variation Example 9

In each of the above-mentioned embodiments, the present invention has been explained as has been adopted in an example of a lens integrated type camera. However, the present invention may be adopted in, for instance, an interchangeable lens camera. The present invention may be adopted in not only cameras but also electronic apparatuses with a camera, such as a PC, a cellular phone, a smart phone, a tablet, etc.

Note that programs that relate to the above-mentioned embodiments can be provided as computer readable program products of various forms, e.g., in the form of recording media or data signals (carrier waves). The above-mentioned types of programs can be provided through recording media such as CD-ROM or data signals such as the Internet.

The present invention is not limited to the above-mentioned embodiments and so far as the features of the present invention are not impaired, other embodiments that are conceivable within the scope of the technical concepts of the present invention are encompassed within the scope of the present invention.

The disclosure of the following priority application is herein incorporated by reference:
Japanese Patent Application No. 2014-201951 (filed on Sep. 30, 2014).

REFERENCE SIGNS LIST

10 . . . image capturing device, 21 . . . image capturing optical system, 22 . . . image sensor, 23 . . . control unit, 24 . . . liquid crystal monitor, 25 . . . memory card, 26 . . . actuation unit, 27 . . . DRAM, 28 . . . flash memory, 29 . . . recording unit

The invention claimed is:

1. An electronic apparatus comprising:
an input unit, of an image sensor having a plurality of imaging regions at which different imaging conditions can be set, into which there are input (i) first image data of a subject imaged in a first imaging region of the plurality of imaging regions and at which a first imaging condition of the image sensor is set, (ii) second image data of a subject imaged in a second imaging region of the plurality of imaging regions and at which a second imaging condition of the image sensor is set, (iii) first position information showing a position of the first imaging region at which the first imaging condition is set, (iv) second position information showing a position of the second imaging region at which the second imaging condition is set, (v) first subject information showing a type of the subject imaged in the first imaging region at which the first imaging condition is set, and (vi) second subject information showing a type of the subject imaged in the second imaging region at which the second imaging condition is set; and
a recording control unit that records, in association with each other, (1) the first image data, (2) the first position information, and (3) the first subject information that have been input to the input unit, and also records, in association with each other, (4) the second image data, (5) the second position information, and (6) the second subject information that have been input to the input unit.

2. The electronic apparatus according to claim 1, wherein:
information showing a main subject or information showing a background is input to the input unit as the first subject information and the second subject information.

3. The electronic apparatus according to claim 2, wherein:
a condition regarding exposure of the first imaging region is input to the input unit as the first imaging condition, and a condition regarding exposure of the second imaging region is input to the input unit as the second imaging condition.

4. The electronic apparatus according to claim 3, wherein:
(i) a condition regarding (a) an amplification factor of an amplification unit that amplifies a signal generated by charges photoelectrically converted in the first imaging region, or (b) a charge accumulation time of a photoelectric conversion unit that photoelectrically converts light incident on the first imaging region is input to the input unit as the condition regarding the exposure of the first imaging region, and (ii) a condition regarding (a) an amplification factor of an amplification unit that amplifies a signal generated by charges photoelectrically converted in the second imaging region, or (b) a charge accumulation time of a photoelectric conversion unit that photoelectrically converts light incident on the second imaging region is input to the input unit as the condition regarding the exposure of the second imaging region.

5. A non-transitory, computer-readable recording medium that stores a computer program that is executable by a computer to cause the computer to perform steps of:
input processing, of an image sensor having a plurality of imaging regions at which different imaging conditions can be set, into which there are input (i) first image data of a subject imaged in a first imaging region of the plurality of imaging regions and at which a first imaging condition of the image sensor is set, (ii) second image data of a subject imaged in a second imaging region of the plurality of imaging regions and at which a second imaging condition of the image sensor is set, (iii) first position information showing a position of the first imaging region at which the first imaging condition is set, (iv) second position information showing a position of the second imaging region at which the second imaging condition is set, (v) first subject information showing a type of the subject imaged in the first imaging region at which the first imaging condition is set, and (vi) second subject information showing a type of the subject imaged in the second imaging region at which the second imaging condition is set; and recording control processing that records, in association with each other, (1) the first image data, (2) the first position information, and (3) the first subject information that have been input in the input processing, and also records, in association with each other, (4) the second image data, (5) the second position information, and (6) the second subject information that have been input in the input processing.

6. The non-transitory, computer-readable recording medium according to claim 5, wherein:

in the input processing, information showing a main subject or information showing a background is input as the first subject information and the second subject information.

7. The non-transitory, computer-readable recording medium according to claim 6, wherein:

in the input processing, a condition regarding exposure of the first imaging region is input as the first imaging condition, and a condition regarding exposure of the second imaging region is input as the second imaging condition.

8. The non-transitory, computer-readable recording medium according to claim 7, wherein:

in the input processing, (i) a condition regarding (a) an amplification factor of an amplification unit that amplifies a signal generated by charges photoelectrically converted in the first imaging region, or (b) a charge accumulation time of a photoelectric conversion unit that photoelectrically converts light incident on the first imaging region is input as the condition regarding the exposure of the first imaging region, and (ii) a condition regarding (a) an amplification factor of an amplification unit that amplifies a signal generated by charges photoelectrically converted in the second imaging region, or (b) a charge accumulation time of a photoelectric conversion unit that photoelectrically converts light incident on the second imaging region is input as the condition regarding the exposure of the second imaging region.

* * * * *